(12) United States Patent
Hirano

(10) Patent No.: US 8,934,704 B2
(45) Date of Patent: Jan. 13, 2015

(54) VISUAL INSPECTION DEVICE, VISUAL INSPECTION METHOD, AND COMPUTER PROGRAM

(71) Applicant: Keyence Corporation, Osaka (JP)

(72) Inventor: Takashi Hirano, Osaka (JP)

(73) Assignee: Keyence Corporation, Osaka (JP)

( * ) Notice: Subject to any disclaimer, the term of this patent is extended or adjusted under 35 U.S.C. 154(b) by 245 days.

(21) Appl. No.: 13/705,298

(22) Filed: Dec. 5, 2012

(65) Prior Publication Data

US 2013/0177232 A1 Jul. 11, 2013

(30) Foreign Application Priority Data

Jan. 6, 2012 (JP) ................................. 2012-001642

(51) Int. Cl.
*G06K 9/00* (2006.01)
*G06T 7/00* (2006.01)

(52) U.S. Cl.
CPC .............. *G06T 7/0004* (2013.01); *G06T 7/001* (2013.01); *G06T 2200/24* (2013.01); *G06T 2207/20081* (2013.01); *G06T 2207/30164* (2013.01)
USPC ........... 382/141; 382/148; 382/263; 382/128; 382/254; 382/260; 382/100; 382/151; 382/287; 382/294

(58) Field of Classification Search
CPC ........... G01N 21/9501; G06T 2200/24; G06T 2207/20081; G06T 2207/30164; G06T 7/0004; G06T 7/001
USPC ......... 382/141, 149, 263, 128, 257, 260, 100, 382/157, 287, 294
See application file for complete search history.

(56) References Cited

U.S. PATENT DOCUMENTS

2002/0057831 A1* 5/2002 Hiroi et al. .................... 382/149
2010/0226561 A1* 9/2010 Fujikawa et al. ............. 382/141

FOREIGN PATENT DOCUMENTS

| JP | 2002-008013 | 1/2002 |
| JP | 2005-142552 | 6/2005 |
| JP | 2005-265661 | 9/2005 |

* cited by examiner

*Primary Examiner* — Mike Rahmjoo
(74) *Attorney, Agent, or Firm* — Kilyk & Bowersox, P.L.L.C.

(57) ABSTRACT

Inputs of a plurality of images constituting a group of images of items regarded as non-defective items are accepted and stored, and a defect threshold for detecting a defective portion of an inspection object and a determination threshold for making a non-defective/defective determination are set based on the plurality of stored images. A defective item image which is an image of an item determined as a defective item is previously stored and when an input of an image newly acquired by capturing an inspection object is accepted, non-defective item learning processing is performed by use of a plurality of stored images including the image whose input has been accepted, to at least reset the defect threshold. A defective portion is re-detected based on the reset defect threshold, to determine whether or not the stored defective item image is an image of a defective item based on the set determination threshold.

15 Claims, 29 Drawing Sheets

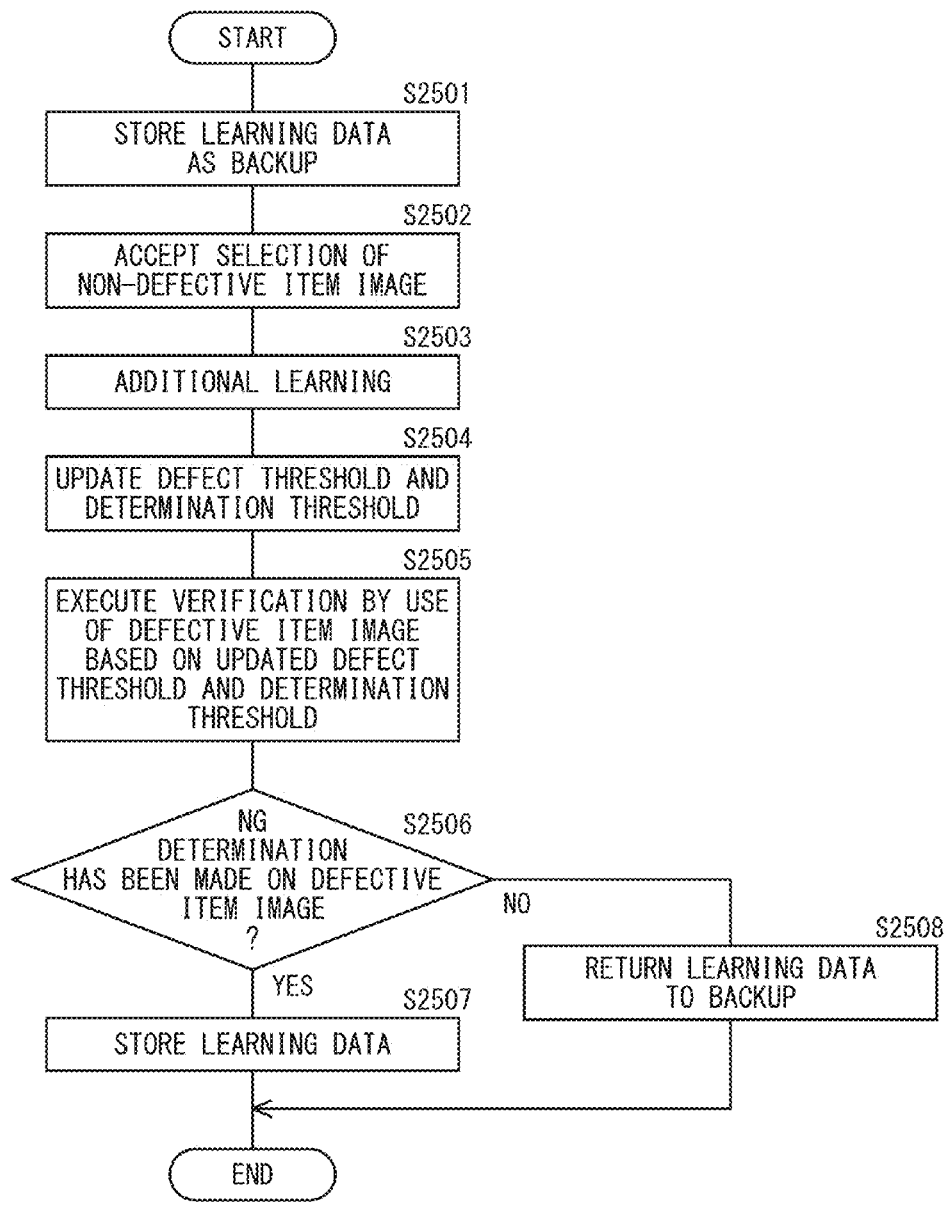

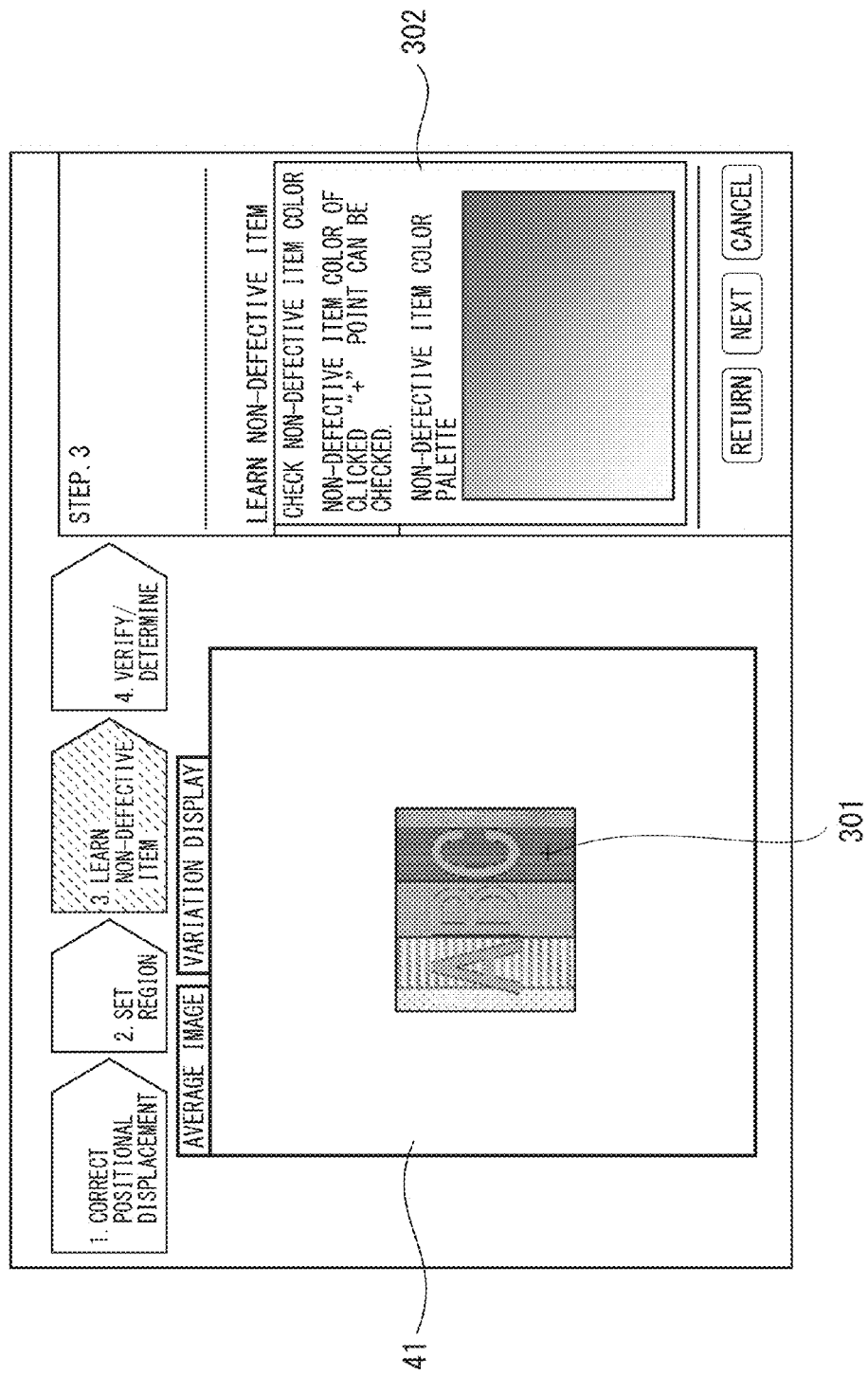

VISUAL INSPECTION DEVICE, VISUAL INSPECTION METHOD, AND COMPUTER PROGRAM

CROSS-REFERENCE TO RELATED APPLICATIONS

The present application claims foreign priority based on Japanese Patent Application No. 2012-001642, filed Jan. 6, 2012, the contents of which is incorporated herein by reference.

BACKGROUND OF THE INVENTION

1. Field of the Invention

The present invention relates to a visual inspection device, a visual inspection method, and a computer program which delete an image of an item determined as a defective item from an image group stored with images of items determined as non-defective items out of a group of images acquired by capturing inspection objects.

2. Description of Related Art

There has hitherto been developed a visual inspection method in which an image acquired by capturing an inspection object is compared with an image of an inspection object to serve as a standard, to thereby determine whether or not the inspection object is a non-defective item. The image to serve as the standard for the determination is an image of an item determined as a non-defective item by visual inspection, and compared with an image acquired by capturing an inspection object to set a determination threshold for making a non-defective/defective determination.

In order to correctly determine a non-defective item as a non-defective item, setting an appropriate determination threshold for making an appropriate non-defective/defective determination is important. For example, Japanese Unexamined Patent Publication No. 2005-265661 discloses an image inspection device using an image processing method of inputting a plurality of non-defective item images to set a determination threshold for making a non-defective/defective determination on an image acquired by capturing an inspection object. In Japanese Unexamined Patent Publication No. 2005-265661, learning is performed each time a non-defective item image is added, and the determination threshold for making the non-defective/defective determination is reset, and hence an appropriate threshold can be set even when slight variations in non-defective/defective determination have occurred.

In the image inspection device using the image processing method disclosed in Japanese Unexamined Patent Publication No. 2005-265661, an erroneous determination might occur in which an item in an image is erroneously determined as a defective item despite it being a non-defective item, and it is thus necessary to execute additional learning which is to add the erroneously determined image to the non-defective item image group and reset the determination threshold. However, there has been a problem in that in some cases, executing additional learning might lead to reduction in determination standard and an image of an item which should essentially be determined as a defective item might be an image erroneously determined as a non-defective item.

SUMMARY OF THE INVENTION

The present invention has been made in view of such circumstances, and an object thereof is to provide a visual inspection device, a visual inspection method, and a computer program which are capable of checking whether or not an item has been erroneously determined as an a non-defective item due to additional learning despite the item being a defective item.

In order to achieve the above object, according to one embodiment of the invention, there is provided a visual inspection device which compares an image acquired by capturing an inspection object with a group of images of items regarded as non-defective items to make a non-defective/defective determination, the device including: an image inputting unit for accepting inputs of a plurality of images constituting a group of images of items regarded as non-defective items, to store these images; a threshold setting unit for setting a defect threshold for detecting a defective portion of an inspection object and a determination threshold for making the non-defective/defective determination based on the plurality of stored images; a defective item image storing unit for storing a defective item image which is an image of an item determined as a defective item; a threshold resetting unit for performing non-defective item learning processing, in a case of acceptance of an input of an image newly acquired by capturing an inspection object, by use of a plurality of stored images including the image whose input has been accepted, to reset at least the defect threshold; a non-defective/defective determination unit for re-detecting a defective portion based on the reset defect threshold, to determine whether or not the stored defective item image is an image of a defective item based on the set determination threshold; and a determination result displaying unit for displaying a non-defective/defective determination result.

Further, according to another embodiment of the invention, the visual inspection device according to the first aspect includes: a backup unit for storing information regarding non-defective item learning processing as a backup; and a selection accepting unit for accepting a selection as to whether or not to return the information to the stored information regarding non-defective item learning processing when an erroneous determination is made that the stored defective item image is an image of a non-defective item in the determination result.

Further, according to still another embodiment of the invention, the visual inspection device according to the second aspect includes an identification information acquiring unit for acquiring identification information for identifying a user, wherein the selection accepting unit displays only an item whose selection is acceptable based on the acquired identification information.

Further, according to still another embodiment of the invention, in the visual inspection device according to the third aspect, the selection accepting unit accepts a selection to update the stored information regarding non-defective item learning processing when the acquired identification information indicates an administrator.

Further, according to still another embodiment of the invention, in the visual inspection device according to the third aspect, the selection accepting unit only accepts a selection to return the information to the stored information regarding non-defective item learning processing when the acquired identification information indicates an operator.

Next, in order to achieve the above object, according to still another embodiment of the invention, there is provided a visual inspection method executable by a visual inspection device which compares an image acquired by capturing an inspection object with a group of images of items regarded as non-defective items to make a non-defective/defective determination, the method including the steps of accepting inputs of a plurality of images constituting a group of images of items regarded as non-defective items, to store these images; setting a defect threshold for detecting a defective portion of an inspection object and a determination threshold for making the non-defective/defective determination based on the plurality of stored images; storing a defective item image which is an image of an item determined as a defective item; performing non-defective item learning processing, in a case of acceptance of an input of an image newly acquired by capturing an inspection object, by use of a plurality of stored images including the image whose input has been accepted, to reset at least the defect threshold; re-detecting a defective portion based on the reset defect threshold, to determine whether or not the stored defective item image is an image of a defective item based on the set determination threshold; and displaying a non-defective/defective determination result.

Further, according to still another embodiment of the invention, the visual inspection method according to the sixth aspect includes the steps of: storing information regarding non-defective item learning processing as a backup; and accepting a selection as to whether or not to return the information to the stored information regarding non-defective item learning processing when an erroneous determination is made that the stored defective item image is an image of a non-defective item in the determination result.

Further, according to still another embodiment of the invention, the visual inspection method according to the seventh aspect includes the step of acquiring identification information for identifying a user, wherein only an item whose selection is acceptable is displayed based on the acquired identification information.

Further, according to still another embodiment of the invention, in the visual inspection method according to the eighth aspect, a selection to update the stored information regarding non-defective item learning processing is accepted when the acquired identification information indicates an administrator.

Further, according to still another embodiment of the invention, in the visual inspection method according to the eighth aspect, only a selection to return the information to the stored information regarding non-defective item learning processing is accepted when the acquired identification information indicates an operator.

Next, in order to achieve the above object, according to still another embodiment of the invention, there is provided a computer program executable by a visual inspection device which compares an image acquired by capturing an inspection object with a group of images of items regarded as non-defective items to make a non-defective/defective determination, the computer program causing the visual inspection device to function as: an image inputting unit for accepting inputs of a plurality of images constituting a group of images of items regarded as non-defective items, to store these images; a threshold setting unit for setting a defect threshold for detecting a defective portion of an inspection object and a determination threshold for making the non-defective/defective determination based on the plurality of stored images; a defective item image storing unit for storing a defective item image which is an image of an item determined as a defective item; a threshold resetting unit for performing non-defective item learning processing, in a case of acceptance of an input of an image newly acquired by capturing an inspection object, by use of a plurality of stored images including the image whose input has been accepted, to reset at least the defect threshold; a non-defective/defective determination unit for re-detecting a defective portion based on the reset defect threshold, to determine whether or not the stored defective item image is an image of a defective item based on the set determination threshold; and a determination result displaying unit for displaying a non-defective/defective determination result.

Further, according to still another embodiment of the invention, in the computer program according to the eleventh aspect, the visual inspection device is caused to function as: a backup unit for storing information regarding non-defective item learning processing as a backup; and a selection accepting unit for accepting a selection as to whether or not to return the information to the stored information regarding non-defective item learning processing when an erroneous determination is made that the stored defective item image is an image of a non-defective item in the determination result.

Further, according to still another embodiment of the invention, in the computer program according to the twelfth aspect, the visual inspection device is caused to function as an identification information acquiring unit for acquiring identification information for identifying a user, and the selection accepting unit is caused to function as a unit for displaying only an item whose selection is acceptable based on the acquired identification information.

Further, according to still another embodiment of the invention, in the computer program according to the thirteenth aspect, the selection accepting unit is caused to function as a unit for accepting a selection to update the stored information regarding non-defective item learning processing when the acquired identification information indicates an administrator.

Further, according to still another embodiment of the invention, in the computer program according to the thirteenth aspect, the selection accepting unit is caused to function as a unit that only accepts a selection to return the information to the stored information regarding non-defective item learning processing when the acquired identification information indicates an operator.

In the first, sixth, and eleventh aspects, inputs of a plurality of images constituting a group of images of items regarded as non-defective items are accepted and stored, and based on the plurality of stored images, a defect threshold for detecting a defective portion of an inspection object and a determination threshold for making a non-defective/defective determination are set. A defective item image which is an image of an item determined as a defective item is previously stored and when an input of an image newly acquired by capturing an inspection object is accepted, non-defective item learning processing is performed by use of a plurality of stored images including the image whose input has been accepted, to at least reset the defect threshold. A defective portion is re-detected based on the reset defect threshold, to determine whether or not the stored defective item image is an image of a defective item based on the set determination threshold, and a non-defective/defective determination result is displayed. Accordingly, when a newly acquired image is added and additional learning is performed, it is possible to check whether or not a defective item image is an image of an item non-erroneously determined as a defective item, and the user can visually check whether or not setting parameters and thresholds, with which non-defective item learning processing has been performed, are appropriate.

In the second, seventh, and twelfth aspects, information regarding non-defective item learning processing is stored as a backup. When the image is an image of an item erroneously determined as a non-defective item in the determination result, a selection as to whether or not to return the information to the stored information regarding non-defective item learning processing is accepted. Thereby, when a new image is added to perform additional learning and a defective item image is an image of an item not correctly determined as a defective item, the non-defective item learning processing is determined as inappropriate and the information can be easily returned to the state before addition of the acquired image. It is thereby possible to avoid a risk of erroneously performing the non-defective item learning processing, so as to perform a non-defective/defective determination more suited for the reality.

In the third, eighth, and thirteenth aspects, identification information for identifying a user is acquired, and only an item whose selection is acceptable is displayed based on the acquired identification information, whereby it is possible to avoid unconditionally disabling the non-defective item learning processing, so as to perform a non-defective/defective determination more suited for the reality.

In the fourth, ninth, and fourteenth aspects, a selection to update the stored information regarding non-defective item learning processing can be accepted when the acquired identification information indicates an administrator, whereby it is possible to perform control such that the information regarding non-defective item learning processing can be updated only when the user is an administrator.

In the fifth, tenth, and fifteenth aspects, only a selection to return the information to the stored information regarding non-defective item learning processing is accepted when the acquired identification information indicates an operator, whereby it is possible to avoid unconditionally updating the information regarding non-defective item learning processing, so as not to waste the previous information regarding non-defective item learning processing.

According to the present invention, inputs of a plurality of images constituting a group of images of items regarded as non-defective items are accepted and stored, and based on the plurality of stored images, a defect threshold for detecting a defective portion of an inspection object and a determination threshold for making a non-defective/defective determination are set based on the plurality of stored images. A defective item image which is an image of an item determined as a defective item is previously stored and when an input of an image newly acquired by capturing an inspection object is accepted, non-defective item learning processing is performed by use of a plurality of stored images including the image whose input has been accepted, to at least reset the defect threshold. A defective portion is re-detected based on the reset defect threshold, to determine whether or not the stored defective item image is an image of a defective item based on the set determination threshold, and a non-defective/defective determination result is displayed. Accordingly, when a newly acquired image is added and additional learning is performed, it is possible to check whether or not a defective item image is an image of an item non-erroneously determined as a defective item, and the user can visually check whether or not setting parameters and thresholds, with which non-defective item learning processing has been performed, are appropriate.

BRIEF DESCRIPTION OF THE DRAWINGS

FIG. 25 is a flowchart showing a procedure of verification processing by use of a defective item image, which is performed by the main control part of the visual inspection device according to the embodiment of the present invention;

FIG. 30 is an exemplary view of a screen for checking a non-defective item color in the visual inspection device according to the embodiment of the present invention.

DETAILED DESCRIPTION OF PREFERRED EMBODIMENTS

Hereinafter, a visual inspection device according to an embodiment of the present invention will be described with reference to the drawings. It is to be noted that elements having the same or similar configurations or functions throughout the drawings referenced in descriptions of the present embodiment are provided with the same or similar numerals, and detailed descriptions thereof are omitted.

Figure 1:
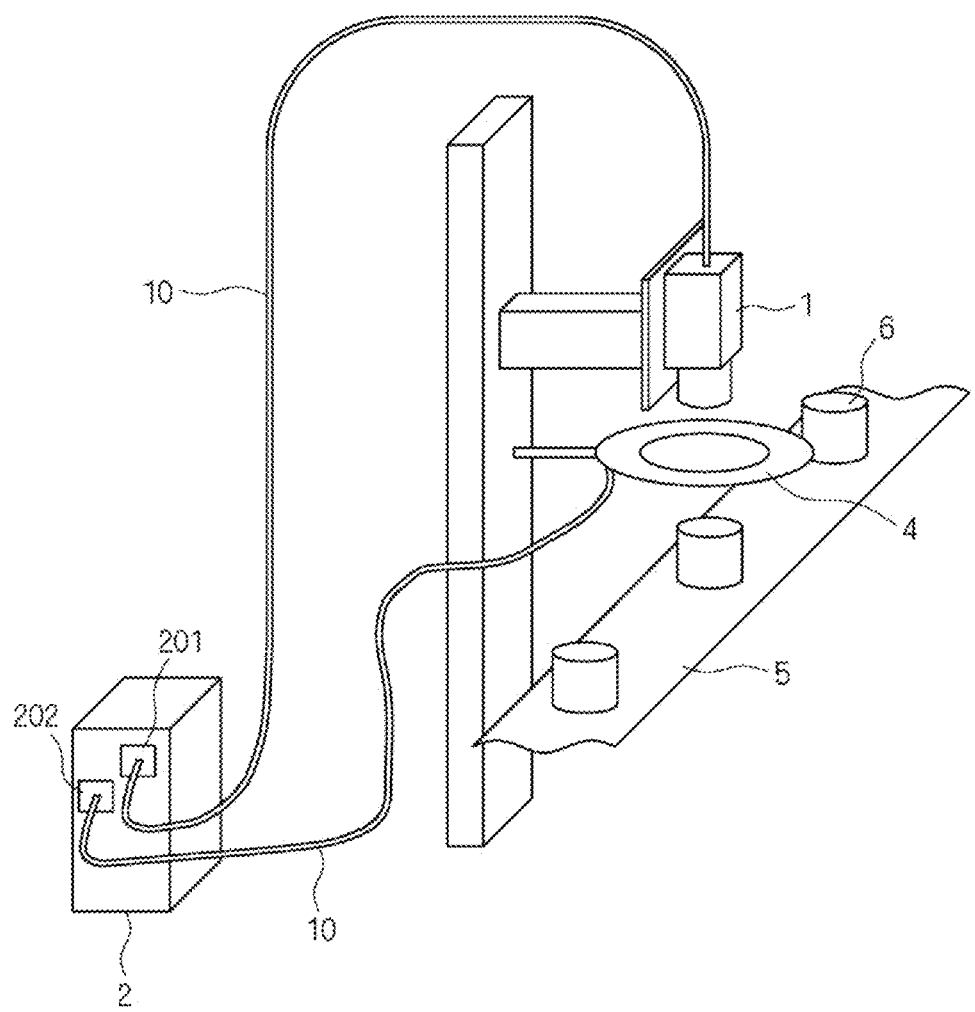
FIG. 1 is a schematic view showing a configuration of a product inspection system including a visual inspection device according to an embodiment of the present invention.

FIG. 1 is a schematic view showing a configuration of a product inspection system including a visual inspection device according to an embodiment of the present invention. As shown in FIG. 1, a product inspection system including a visual inspection device according to the present embodiment is configured by a camera 1 and a visual inspection device 2 connected with the camera 1 through a connection cable 10 in a data communicable manner. The visual inspection device 2 is connected with a display device (not shown), and houses an image processing controlling part 201 and an illumination controlling part 202.

Further, the illumination controlling part 202 is connected with an illumination device 4 through the connection cable 10 in a data communicable manner. An inspection object 6 moving on a conveyor belt 5 is irradiated with light by the illumination device 4, and an image of the inspection object 6 is captured by the camera 1. Based on the captured image of the inspection object 6, the visual inspection device 2 determines whether the inspection object 6 is a non-defective item or a defective item.

The camera 1 includes therein an FPGA, a DSP, or the like for performing image processing, and includes a camera module having an imaging element for capturing the image of the inspection object 6. A CMOS substrate is provided as the imaging element, and for example, a captured color image is converted to an HDR image by the CMOS substrate based on its conversion characteristic of expanding a dynamic range.

A plurality of inspection objects 6 flow on a line of the conveyor belt 5. The image of the inspection object 6 is captured by the camera 1 set over (or under, or lateral to) the inspection object 6, and the captured image is compared with a standard image (e.g., captured image of a non-defective item), to determine whether or not a flaw, a defect or the like exists in the inspection object 6. When determined that a flaw, a defect, or the like exists in the inspection object 6, an NG determination is made. On the other hand, when determined that a flaw, a defect or the like does not exist in the inspection object 6, an OK determination is made. In such a manner, the visual inspection device 2 according to the present embodiment makes a non-defective/defective determination on the inspection object 6 by use of the captured image of the inspection object 6.

Herein, in the case of performing visual inspection on the inspection object 6, it is necessary to set a variety of parameters to be used for the inspection. These parameters are, for example, an imaging parameter for setting an imaging condition, an illumination parameter for setting an illumination condition, and an image processing parameter (inspection parameter) for setting an inspection condition indicative of how the inspection is to be performed. In the visual inspection device 2, these variety of parameters are set before the foregoing non-defective/defective determination is made. In short, the visual inspection device 2 has an operation mode (Run mode) for making the non-defective/defective determination on the inspection object 6 and a setting mode (Non-Run mode) for setting a variety of parameters to be used for the inspection, and has a mode switching unit (not shown) for switching these modes.

The user sets (adjusts) optimum parameter values with respect to the variety of parameters on the setting mode before the non-defective/defective determination is repeatedly performed on a plurality of inspection objects 6 flowing on the line of the conveyor belt 5 in the operation mode. Basically, default values are set with respect to the variety of parameters, and when the user determines that the default values are optimal as the parameter values, the parameter values are not required to be adjusted.

Meanwhile, the parameter values can be adjusted in accordance with the kind of the inspection object 6 or variations in inspection environment. The visual inspection device 2 according to the present embodiment has a function of preventing mixture of an image of a defective item into the image group to serve as the standard for setting the determination threshold in the case of setting the optimum parameter values on the setting mode. Hereinafter, a configuration and a processing procedure of the visual inspection device 2 according to the present embodiment will be described in detail.

Figure 2:
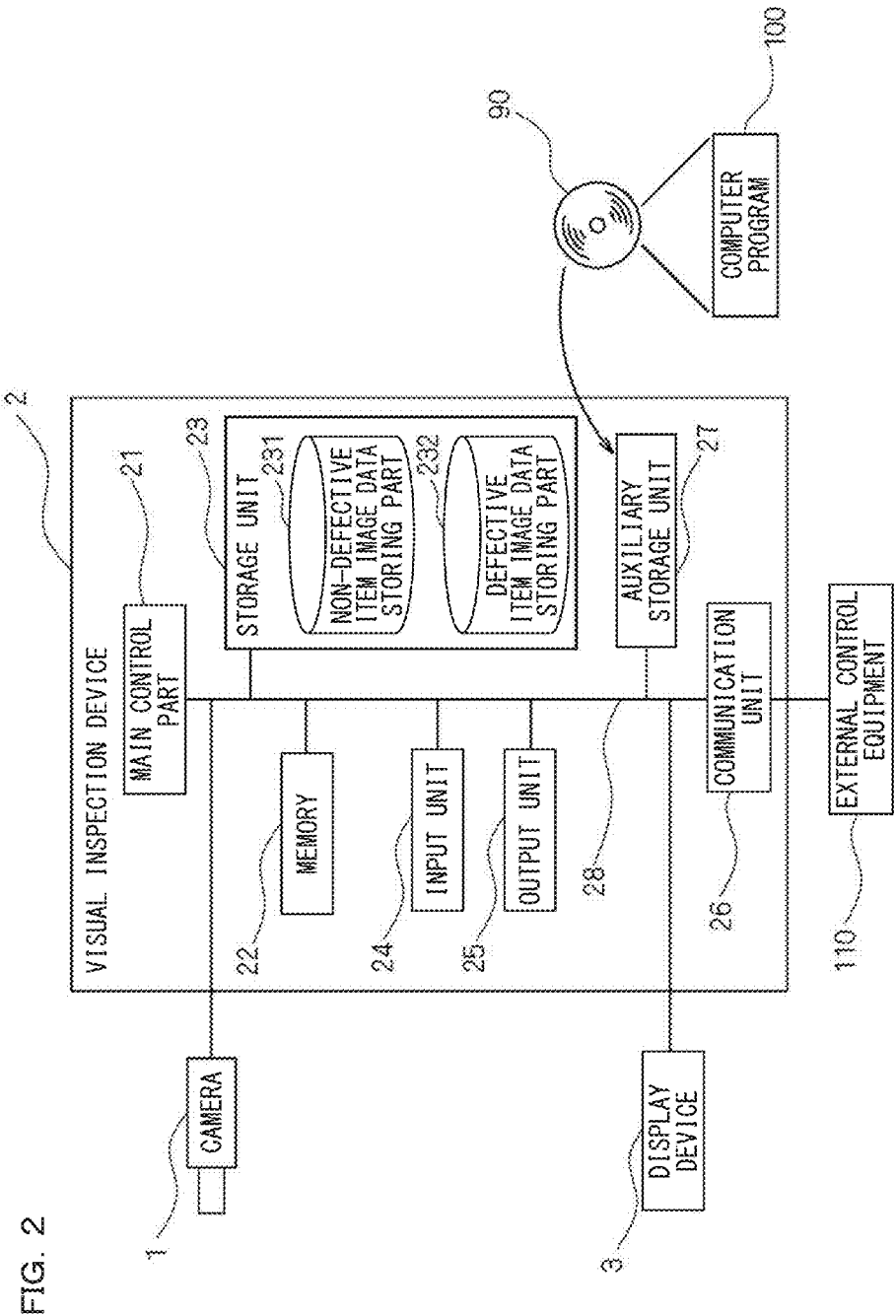
FIG. 2 is a block diagram schematically showing a configuration of the visual inspection device according to the embodiment of the present invention.

FIG. 2 is a block diagram schematically showing a configuration of the visual inspection device according to the embodiment of the present invention. As shown in FIG. 2, the visual inspection device 2 according to the present embodiment is connected with the camera 1 for capturing an image and a display device 3 for displaying the captured image or an image produced in the course of arithmetic processing.

The visual inspection device 2 is at least configured by a CPU (Central Processing Unit), a main control part 21 made up of an LSI or the like, a memory 22, a storage unit 23, an input unit 24, an output unit 25, a communication unit 26, an auxiliary storage unit 27, and an internal bus 28 for connecting the foregoing hardware. The main control part 21 is connected with each part of the hardware of the visual inspection device 2 as thus described through the internal bus 28, and controls an operation of each part of the foregoing hardware, while executing a variety of software-based functions in accordance with a computer program 100 stored in the storage unit 23. The memory 22 is configured by a volatile memory such as an SRAM, an SDRAM or the like and deployed with a load module at the time of execution of the computer program 100, and stores temporary data and the like generated at the time of execution of the computer program 100.

The storage unit 23 is configured by a built-in fixed-type storage unit (hard disk, flash memory), a ROM, or the like. The computer program 100 stored in the storage unit 23 is downloaded by the auxiliary storage unit 27 from a movable recording medium 90 such as a DVD, a CD-ROM, or a flash memory, where information such as a program and data is recorded, and at the time of execution, the computer program 100 is deployed from the storage unit 23 to the memory 22, and then executed. Naturally, it may be a computer program downloaded from an external computer through the communication unit 26.

The storage unit 23 is provided with a non-defective item image data storing part 231 for storing image data of a plurality of images constituting the group of images of items regarded as non-defective items. Although the non-defective item image data storing part 231 stores image data of an image of an item regarded as a non-defective item, the data also includes image data of an image of an item erroneously determined by the user as a non-defective item despite it being a defective item. That is, image data of an image of a unit determined by the user as a non-defective item (regardless of the item being a non-defective item or not) is stored. In other words, the non-defective item image data to be stored into the non-defective item image data storing part 231 is selected and inputted by the user as one image to constitute the group of images of items regarded as non-defective items, the group serving as the standard for setting the determination threshold. Especially for performing below-mentioned non-defective item learning processing, the user selects an image of the inspection object 6 determined by the user as an image of a non-defective item by use of the display device 3, the input unit 24, and the like, and image data of a plurality of selected images is stored into the non-defective item image data storing part 231.

The communication unit 26 is connected to the internal bus 28, and can transmit and receive data to and from the external computer and the like by being connected to an external network such as the Internet, a LAN, or a WAN. That is, the foregoing storage unit 23 is not limited to the configuration of being housed in the visual inspection device 2, but the storage unit 23 may be an external recording medium such as a hard disk installed in an external server computer or the like which is connected through the communication unit 26.

The input unit 24 is a broad concept including, in addition to data inputting media such as a keyboard and a mouse, a device in general for acquiring input information, such as a touch panel integrated with a liquid crystal panel or the like. The output unit 25 refers to a print device such as a laser printer, a dot printer, or the like.

The camera 1 is a CCD camera provided with a CCD imaging element, or the like. The display device 3 is a display device having a CRT, a liquid crystal panel, or the like. The camera 1, the display device 3, and the like may be integrated with the visual inspection device 2, or may be separated therefrom. External control equipment 110 is control equipment connected through the communication unit 26, and for example, a PLC (Programmable Logic Controller) or the like corresponds to the equipment. Herein, the external control equipment 110 refers to equipment in general to perform post-processing in accordance with a result of inspection by the visual inspection device 2.

Figure 3:
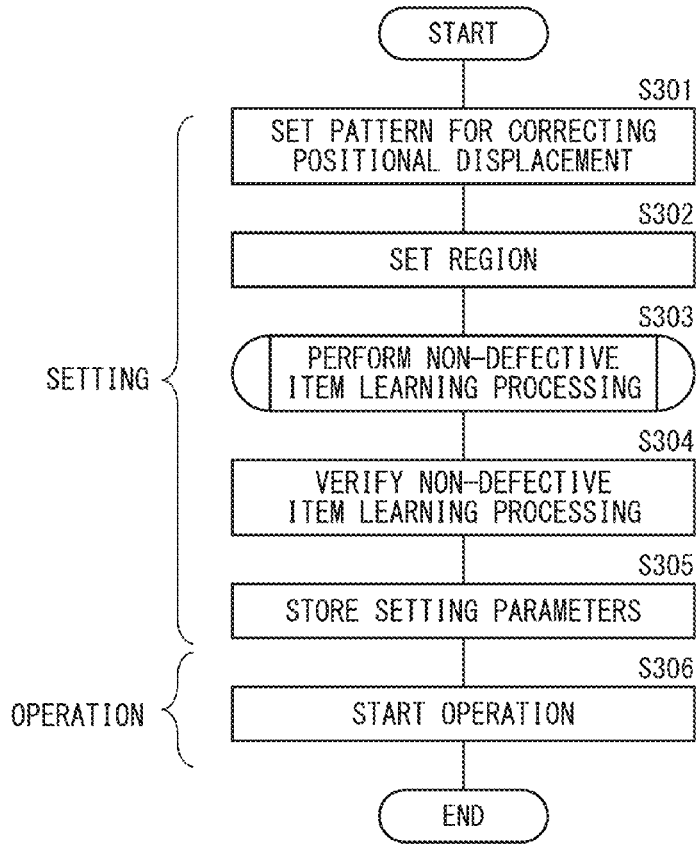
FIG. 3 is a flowchart showing a procedure of setting processing for a variety of parameters which is performed by a main control part of the visual inspection device according to the embodiment of the present invention.

FIG. 3 is a flowchart showing a procedure of setting processing for a variety of parameters performed by the main control part 21 of the visual inspection device 2 according to the embodiment of the present invention. The visual inspection device 2 according to the present embodiment is provided with a plurality of image processing tools (stored in the storage unit 23) which perform a variety of image processing on an image acquired by capturing by the camera 1. Based on a description of inspection requiring desired image processing, the user previously selects one or a plurality of image processing tools with respect to the inspection object, and makes a non-defective/defective determination by use of selected plurality of image processing tools. Examples of a typical image processing tool include "area" for measuring an area of a specific place, "pattern search" for detecting a pattern, "edge positioning" for measuring a position of an edge, "blob" for measuring a characteristic amount regarding a blob, "flaw" for detecting a flaw due to a change. In the present embodiment, in addition to these tools, "learning inspection" exists as an image processing tool for automatically defining a range of a non-defective item by learning a plurality of non-defective item images, to detect an item which is "not a non-defective item". A flowchart shown in FIG. 3 shows a processing procedure in the case of the user performing on a setting mode a variety of setting with regard to "learning inspection" out of the plurality of image processing tools.

In FIG. 3, the main control part 21 of the visual inspection device 2 sets a positional displacement correcting pattern with respect to an image of the inspection object 6 whose input has been accepted (step S301). Specifically, with subtle positional displacement of an image of the inspection object 6 whose input has been accepted, setting a pattern of image to serve as a standard allows adjustment of the positional displacement of the image of the inspection object 6 whose input has been accepted. In short, on a screen of the display device 3 displayed with an image acquired by capturing by the camera 1 or a standard image (registered image) previously stored in the storage unit 23, the user sets a "window for positional displacement correction" with respect to a characteristic region within the image. The set "window for positional displacement correction" may be formed in whatever shape, such as a rectangular shape or a circular shape.

The main control part 21 sets a region to be inspected (step S302). Specifically, selecting a rectangular region, a circular region, or the like allows setting of a region for inspecting the presence or absence of a defect. That is, the user sets a "window for inspection" for specifying the region to inspect the presence or absence of a defect with respect to an image set with the "window for positional displacement correction" on the screen of the display device 3. Herein, the relative positional relation between the set "window for inspection" and the "window for positional displacement correction" set in step S301 is stored into the storage unit 23. Then, in the below-mentioned operation mode, first, a characteristic region is detected from an input image to serve as an inspection object, to detect a position of the "window for positional displacement correction". Then, a position of the "window for inspection" located in the relative positional relation with the "window for positional displacement correction" is set, to allow detection of the presence or absence of a defect within the "window for inspection". In such a manner, the "window for positional displacement correction" and the "window for inspection" set in steps S301 and S302 are used for specifying the region for inspecting the presence or absence of a defect in the operation mode.

Figure 4:
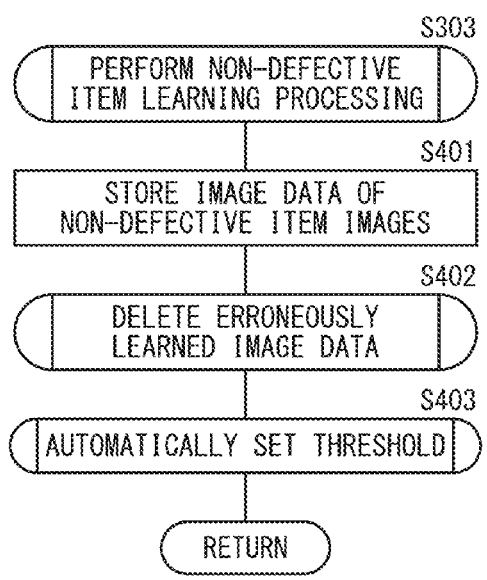
FIG. 4 is a flowchart showing a procedure of non-defective item learning processing performed by the main control part of the visual inspection device according to the embodiment of the present invention.

The main control part 21 performs non-defective item learning processing (step S303). Specifically, the non-defective item learning processing is performed as shown in FIG. 4. FIG. 4 is a flowchart showing a procedure of the non-defective item learning processing (step S303 of FIG. 3) performed by the main control part 21 of the visual inspection device 2 according to the embodiment of the present invention.

In FIG. 4, the main control part 21 of the visual inspection device 2 stores image data of a plurality of images, selected as items of non-defective items by the user through the input unit 24 or the like, into the non-defective item image data storing part 231 (step S401). The plurality of pieces of image data stored in the non-defective item image data storing part 231 becomes a group of images of items regarded as non-defective items.

Next, an image which should not essentially be stored into the non-defective item image data storing part 231, namely, an image which might cause deterioration in accuracy in detecting a defective portion (erroneous setting of a defect threshold) and has been mixed by erroneous learning, is deleted from the group of images of items regarded as non-defective items (step S402). Conventionally, the user performs visual checking, and selects and deletes an image of an item which has been determined as a defective item. However, visually checking all images stored in the non-defective item image data storing part 231 is a very complicated operation. Thereat, in the visual inspection device 2 according to the present embodiment, an image which should not essentially be stored into the non-defective item image data storing part 231 is automatically deleted. A detail thereof will be described later with reference to FIGS. 5 and 6.

After a more appropriate image group is obtained by step S402, the determination threshold for making the non-defective/defective determination may be automatically reset (step S403). A method for calculating the determination threshold is, for example, performed in accordance with the following procedure.

The main control part 21 detects a defective portion with respect to each of all the images stored in the non-defective item image data storing part 231 based on the defect threshold already set in step S402, and acquires a frequency distribution of concentrations of the detected defective portions as a histogram. Subsequently, the main control part 21 calculates a new defect threshold by statistical processing.

The main control part 21 automatically calculates an optimum defect threshold for example by use of at least one of a parametric technique (e.g. Smirnov-Grubbs test, or the like) which is premised that a concentration to serve as an object for the statistical processing follows a regular distribution, and a non-parametric technique (e.g. a test using a box-and-whisker plot, or the like) which is premised that the concentration does not follow the regular distribution. The main control part 21 performs testing as to whether or not a defect amount of each of the detected defective portions is an outlier by use of the acquired histogram. When an apparent outlier is found, a new defect threshold capable of deleting the found outlier is automatically calculated. For example, the defect threshold may be set in between the found outlier and a median of portions other than the found outlier.

The main control part 21 re-detects a defective portion with respect to the foregoing image group (each of all the images stored in the non-defective item image data storing part 231) based on the calculated new defect threshold, and thereafter, calculates and sets a new determination threshold based on a defect amount of the detected defective portion. As a technique for calculating and setting the determination threshold, for example, the maximum value of the calculated defect amount or a statistically calculated value larger than the maximum value may be set as the determination threshold, or testing as to whether or not a defect amount of each of the detected defective portions is an outlier may be performed by statistical processing, and a new determination threshold may be calculated and set so that an image having the defect amount tested to be an outlier is deleted from the image group. By automatic setting for the threshold, for example, it is possible to more reliably reflect the user's intention to make an OK determination on the inspection object 6 which only has a slight flaw.

Returning to FIG. 3, the main control part 21 of the visual inspection device 2 verifies whether or not the non-defective item learning processing has been correctly performed (step S304), and adjusts setting parameters such that a non-defective item is correctly determined as a non-defective item. Specifically, the non-defective/defective determination is performed on non-defective item images acquired by capturing a number of inspection objects (non-defective items) 6 for testing by the camera 1 or the plurality of stored non-defective item images, and the user manually adjusts the setting parameters so as to obtain a correct result. After the optimal adjustment of the setting parameters, the main control part 21 stores the adjusted setting parameters (step S305), to complete the setting mode. The processing shown in steps S301 to S305 is a so-called operation on the setting mode.

Next, when a predetermined button (e.g. operation button) or the like is selected by the user through the input unit 24 or the like, the mode is shifted from the setting mode to the operation mode, and an operation of making the non-defective/defective determination on the inspection object 6 flowing on the line of the conveyor belt 5 is started (step S306). More specifically, when a trigger signal indicating arrival of the inspection object 6 under the camera 1 is inputted from the outside, the visual inspection device 2 captures the image of the inspection object 6 and makes the non-defective/defective determination by use of the setting parameters stored in step S305.

Further, more specifically describing, as mentioned above, a characteristic region is first detected from an input image acquired by capturing the inspection object 6 (refer to step S301), to detect a position of the "window for positional displacement correction". Then, a position of the "window for inspection" located in the relative positional relation with the "window for positional displacement correction" is set, to make a non-defective/defective determination on an image within the "window for inspection" by use of the setting parameters stored in step S305.

However, since the example where only the "learning inspection" is set as the image processing tool is shown in the present embodiment, an NG determination is made when a defect amount of the "learning inspection" exceeds an upper limit (determination threshold). As opposed to this, when a plurality of image processing tools such as the foregoing "area" and the "flaw" are set, an NG determination may be made when processing by any of the set image processing tools becomes NG.

Further, although only one camera 1 is connected to the visual inspection device 2 in the present embodiment, the number of cameras 1 is not particularly limited to one, and for example, a plurality of cameras 1 may be connected. In the case where a plurality of cameras 1 are connected to the visual inspection device 2, the foregoing image processing tool may previously be set with respect to each of input images captured by the respective cameras 1, and an NG determination may be made when a result of visual inspection on an image inputted from any of the cameras 1 is NG in the visual inspection thereof.

Moreover, although the executing order of the plurality of image processing tools is not particularly described in the present embodiment, for example, a flowchart may be created in which the processing order for the plurality of image processing tools is set. In short, when the image processing tool is set with respect to each of the plurality of "windows for inspection", the user may be able to set the plurality of set image processing tools on the display device 3. In this case, a program in which the processing order for the plurality of image processing tools is set is stored into the storage unit 23, and the main control part 21 executes the plurality of image processing tools in accordance with the stored program, and outputs an NG determination when a result of an inspection using any of the image processing tools is NG.

Figure 5:
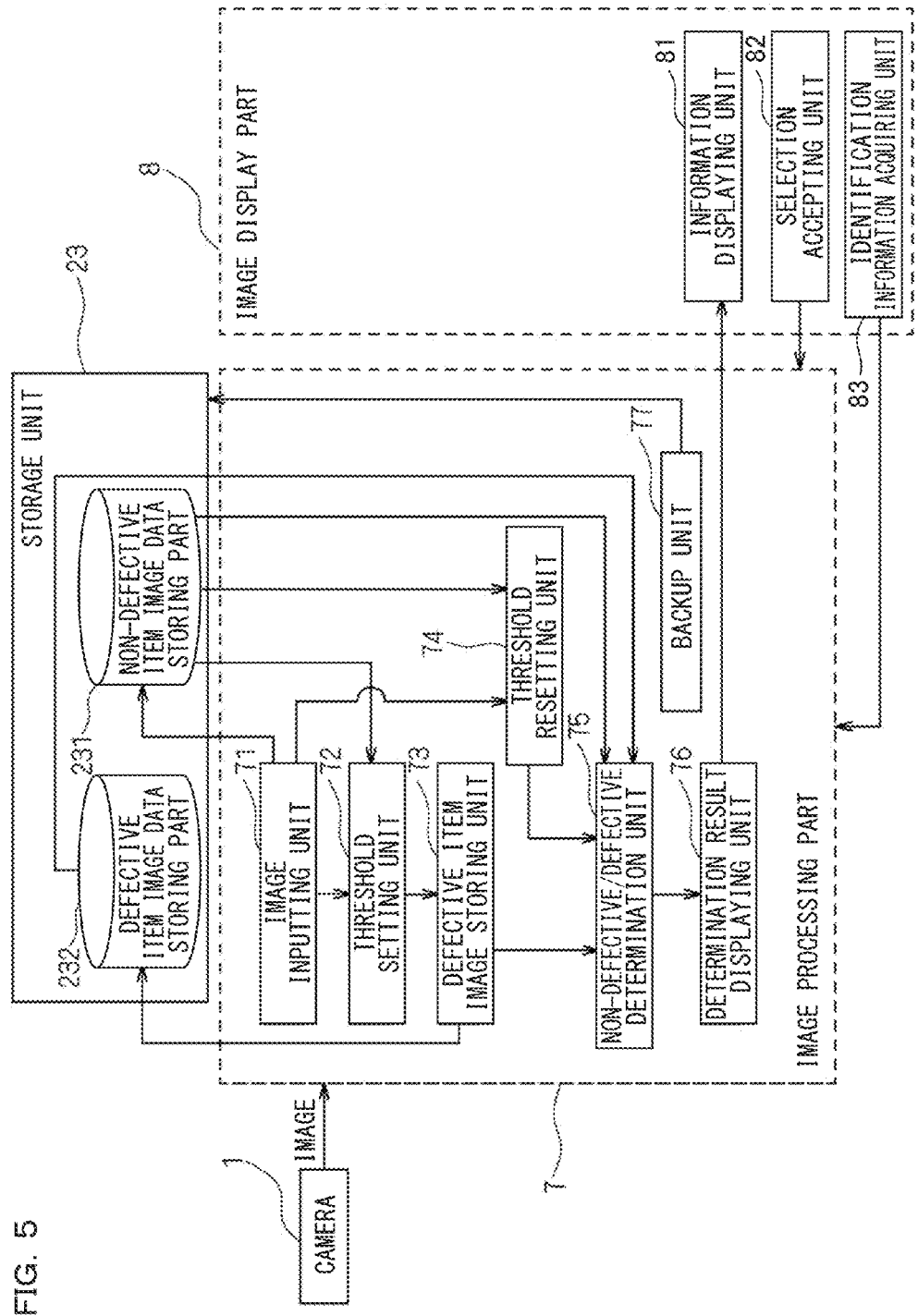
FIG. 5 is a functional block diagram showing a configuration example of the visual inspection device according to the embodiment of the present invention.

In the processing of step S402 shown in FIG. 4, the visual inspection device 2 according to the embodiment of the present invention deletes an image, erroneously stored as a non-defective item image despite it being an image of a defective item (which the user desires to treat as a defective item) based on statistical processing. FIG. 5 is a functional block diagram showing a configuration example of the visual inspection device 2 according to the embodiment of the present invention. In FIG. 5, the visual inspection device 2 according to the present embodiment is configured by the camera 1, an image processing part 7 for performing processing of the visual inspection device 2, the storage unit 23, and an image display part 8.

The camera 1 is, for example, a digital camera. The camera 1 acquires an image by capturing, for example, a film surface as the inspection object 6, and outputs the image to the image processing part 7.

The image processing part 7 includes an image inputting unit 71, a threshold setting unit 72, a defective item image storing unit 73, a threshold resetting unit 74, a non-defective/defective determination unit 75, a determination result displaying unit 76, and a backup unit 77. Further, the image processing part 7 is configured to include the main control part 21, the memory 22, an external I/F, and the like, and controls processing operations of the image inputting unit 71, the threshold setting unit 72, the defective item image storing unit 73, the threshold resetting unit 74, the non-defective/defective determination unit 75, the determination result displaying unit 76, and the backup unit 77.

The storage unit 23 functions as an image memory and stores, as necessary, image data of an image acquired by capturing by the camera 1 and image data after being subjected to a variety of processing such as alignment and average value calculation in the image processing part 7. The image may not be stored as image data, but may be stored as brightness value data per pixel.

The image display part 8 is configured by the display device 3 such as a monitor for a computer. An information displaying unit 81 of the image display part 8 displays, on a display screen of the display device 3, a captured image of the inspection object 6 to serve as an object for the non-defective/defective determination and a result of determination as to whether or not the object is a non-defective item. That is, while an image in accordance with designation by the image processing part 7 is displayed on the display screen of the display device 3, a result of determination as to whether or not the inspection object 6 is a non-defective item is also displayed thereon. A selection accepting unit 82 accepts a selection as to whether or not to return the information to the stored information regarding non-defective item learning processing when the image is an image of an item erroneously determined as a non-defective item in the determination result. An identification information acquiring unit 83 acquires identification information for identifying a user. The selection accepting unit 82 can accept a selection to update the stored information regarding non-defective item learning processing only when the acquired identification information indicates an administrator and not a user.

Next, each configuration of the image processing part 7 will be described.

The image inputting unit 71 accepts inputs of a plurality of images constituting the group of images which were captured by the camera 1 and images of items regarded as non-defective items, and stores these images into the non-defective item image data storing part 231 of the storage unit 23. An image may be inputted in whatever mode of input. For example, image data of a plurality of images acquired by capturing a number of inspection objects 6 for testing by the camera 1 may be stored into the non-defective item image data storing part 231. Further, an image of one inspection object 6 for testing may be captured by the camera 1 a plurality of times while an external environment such as an illumination environment is changed, and image data of the plurality of acquired images may be stored into the non-defective item image data storing part 231. Moreover, a plurality of inspection objects 6 may be allowed to flow on the line of the conveyor belt 5 and images of the inspection objects 6 may be captured by the camera 1, the user may select a plurality of images of items that should be determined as non-defective items out of the plurality of acquired images, and image data of the selected images may be stored into the non-defective item image data storing part 231. In short, image data of a plurality of images acquired by capturing by the camera 1 or image data of a plurality of images selected by the user from the plurality of images acquired by capturing by the camera 1 is stored into the non-defective item image data storing part 231. Previously storing a plurality of pieces of image data of images of items determined as non-defective items allows storing of these image data as the image group to serve as the standard for setting the determination threshold for making the non-defective/defective determination. Image data regarding each image whose input has been accepted is stored into the non-defective item image data storing part 231 of the storage unit 23.

Figure 7:
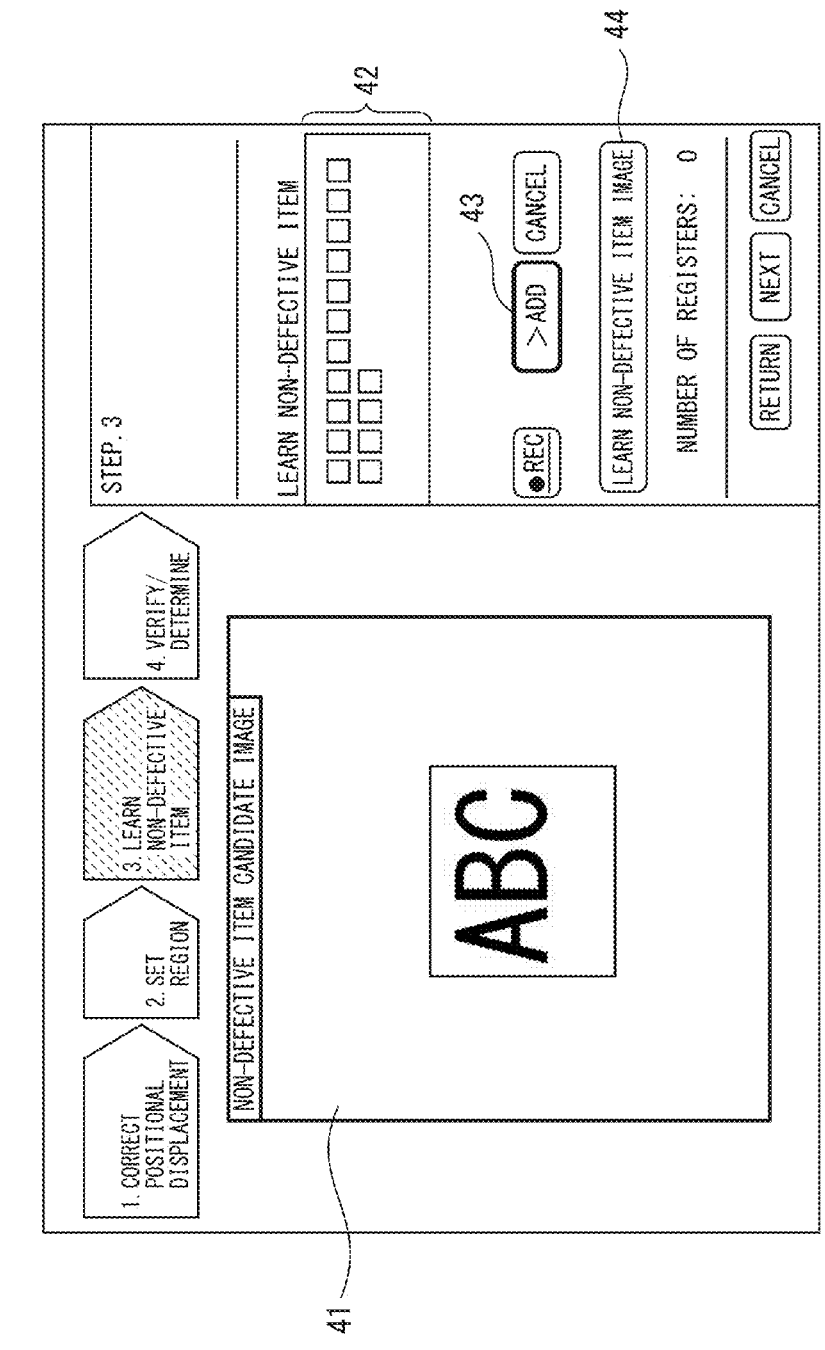
FIG. 7 is an exemplary view of a non-defective item image input accepting screen in the visual inspection device according to the embodiment of the present invention.

FIG. 7 is an exemplary view of a non-defective item image input accepting screen in the visual inspection device 2 according to the embodiment of the present invention. As shown in FIG. 7, an image of the inspection object 6 captured by the camera 1 (or one image selected by the user out of a plurality of already acquired images) is displayed in an image displaying region (main image displaying part) 41. In the non-defective item learning processing, it is displayed as a candidate of an image to be stored as a non-defective item image.

In a non-defective item learning result display region (non-defective item learning result display part) 42, one icon is displayed per image stored as a non-defective item image at this stage. In FIG. 7, it is displayed with a "□" mark. When an "ADD" button 43 is selected, an input of an image being displayed in the image display region 41 is accepted. An image whose input has been accepted is stored into the non-defective item image data storing part 231 as a non-defective item image.

Next, when a "LEARN NON-DEFECTIVE ITEM IMAGE" button 44 is selected, the processing shown in step S402 (and the processing shown in step S403) of FIG. 4 is performed.

Figure 8:
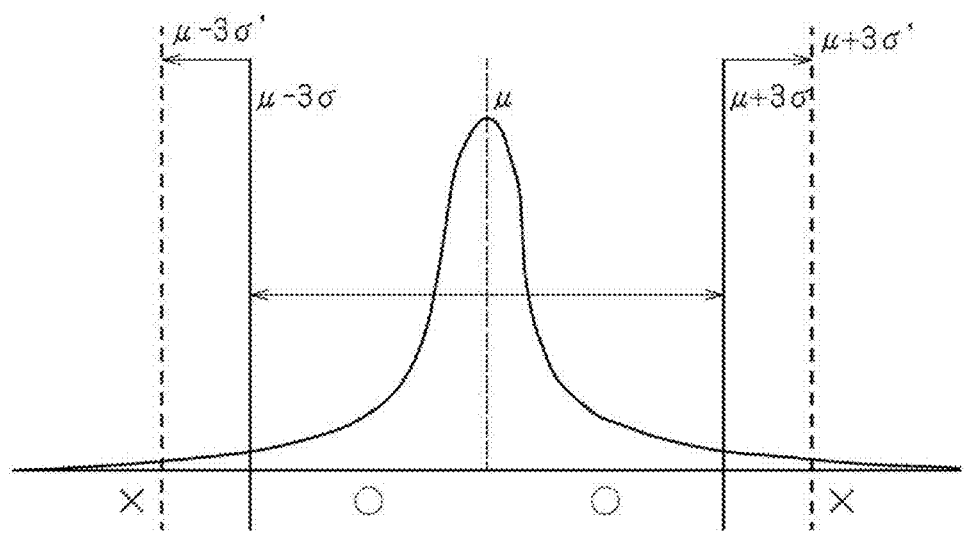
FIG. 8 is an exemplary view showing a distribution of concentration values of arbitrary pixels in a non-defective item image stored in a non-defective item image data storing part.

Returning to FIG. 5, the threshold setting unit 72 sets a defect threshold. Specifically, based on the image data of the image whose inputs has been accepted and/or non-defective item image data stored as non-defective item images in the non-defective item image data storing part 231, an average image and a standard deviation image are calculated. It is then assumed that a concentration is regularly distributed by use of an average $\mu$ of a concentration value per pixel and a standard deviation $\sigma$ of the concentration value. FIG. 8 is an exemplary view showing a distribution of concentration values of arbitrary pixels in the non-defective item image stored in the non-defective item image data storing part 231. A horizontal axis indicates a concentration value (generally an integer value of 0 to 255), and a vertical axis indicates a frequency. For example, when 30 non-defective item images are present, a total frequency is 30.

As shown in FIG. 8, the concentration is regularly distributed, and in the present embodiment, with the average $\mu$ of the concentration value taken at the center, ($\mu-3\sigma$) and ($\mu+3\sigma$) are each regarded as an initial value of the defect threshold for detecting a defective portion. That is, as for an arbitrary pixel, when a concentration value of an image of the inspection object 6 is within the range from ($\mu-3\sigma$) to ($\mu+3\sigma$), the pixel is determined not to be a defective pixel ("○" mark in FIG. 8). On the other hand, as for an arbitrary pixel, when a concentration value of an image of the inspection object 6 is not within the range from ($\mu-3\sigma$) to ($\mu+3\sigma$), the pixel is determined to be a defective pixel ("x" mark in FIG. 8). As for all pixels other than the above, it is determined whether or not each of these pixels is a defective pixel. Needless to say, the defect threshold for detecting a defective portion is changeable, and the setting can be changed (adjusted) by the threshold setting unit 72. In addition, although the defect threshold is set per pixel in the present embodiment, the present invention is not limited thereto, and for example, the defect threshold may be set per region made up of a plurality of pixels (e.g. rectangular region of 4×4 pixels). In this case, for example, whether or not to detect the rectangular region of 4×4 pixels as a defective portion is decided in accordance with whether or not a concentration value of a pixel having the maximum concentration value in the region exceeds the defect threshold.

Herein, a defect amount with respect to each of the non-defective item image data stored in the non-defective item image data storing part 231 is calculated by a defect amount calculating unit (not shown). Specifically, a total (concentration integrated value) of difference concentration values of pixels determined as defective pixels (absolute values of values each obtained by deducting a pixel value of image data of the average image from a pixel value of a piece of image data stored in the non-defective item image data storing part 231, namely, the degree of separation from the average $\mu$ of the concentration value) is calculated as a defect amount. Thereby, for example, when there are 30 pieces of non-defective item image data, 30 defect amounts are calculated.

In addition, although a total of difference concentration values of pixels determined to be defective pixels is calculated as a defect amount in the present embodiment, a variety of calculation methods other than that can be considered. For example, it may be calculated as a total of concentration volumes of a blob (region made up of a plurality of defective pixels) detected in the region to be inspected, which has been set in step S302 of FIG. 3. That is, a continuous region whose concentration value is larger than the defect threshold in the region to be inspected is recognized as a blob and a defect amount is calculated as a concentration integrated value obtained by summing up difference concentration values included in the blob. In the case of using the difference concentration value, a portion which extends in a broad range but has a low concentration is unlikely to be detected as a defective portion. In the present embodiment, such a defective portion can be reliably detected by use of the concentration integrated value.

Further, the concentration integrated value may not be used, but a total of concentration values of pixels determined as defective pixels or a total of concentration values of a blob detected as a defective portion may simply be calculated as a defect amount. The maximum concentration value out of the concentration values of pixels determined as defective pixels may be regarded as a defect amount. In short, as long as the defect amount is a numerical value that can be compared with the determination threshold for making the non-defective/defective determination on the inspection object 6, the defect amount may be a defect concentration value indicating the degree of separation from the defect threshold, or may be a defective area indicating a pixel or an area of a blob over the defect threshold, or may be a defect concentration volume obtained by multiplying the defect concentration value by the defective area.

Further, an outlier testing unit (not shown) tests whether or not each of the calculated defect amounts is an outlier by statistical processing. For testing the outlier, at least one of a parametric technique which is premised that a defect amount to serve as an object of statistical processing follows a fixed probability distribution such as a regular distribution and the non-parametric technique which is premised that the defect amount does not follow the regular distribution. In the present embodiment, both techniques are used. That is, a defect amount which is tested to be an outlier in the parametric technique and also tested to be an outlier in the non-parametric technique is regarded as an outlier. This can prevent a value which is not an outlier from being erroneously tested to be an outlier whether or not the defect amount follows the regular distribution. Details of the parametric technique and the non-parametric technique will be described later.

As a result, since outlier information for specifying an image whose defect amount has been tested to be the outlier is displayed and outputted, the user can easily determine whether or not to leave an image specified by the displayed outlier information, namely, an image of the inspection object 6 which is likely to be a defective item, in the group of images of items regarded as non-defective items which serves as the standard for the determination threshold (whether or not to leave the image in the non-defective item image data storing part 231). Although the outlier information is displayed on the display device 3 in the present embodiment, alternatively, the outlier information may be displayed in external equipment such as a PLC.

Figure 6:
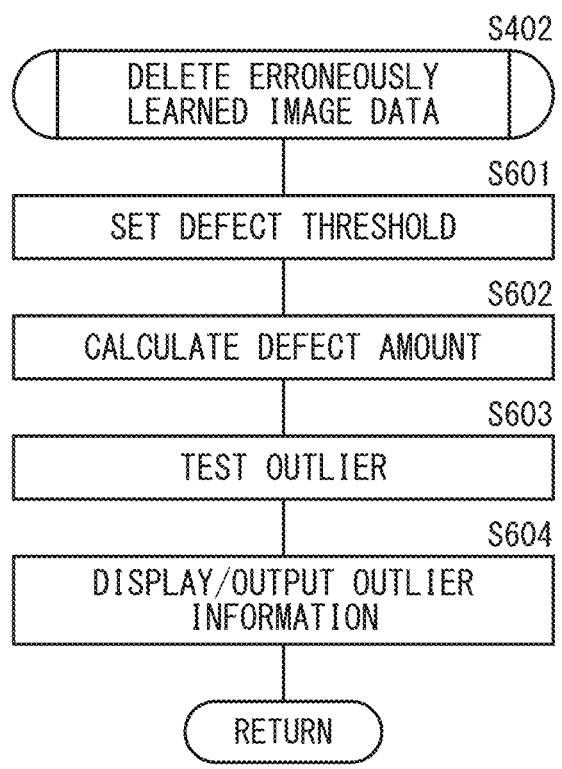
FIG. 6 is a flowchart showing a procedure of deletion processing for erroneously learned image data, which is performed by the main control part of the visual inspection device according to the embodiment of the present invention.

FIG. 6 is a flowchart showing a procedure of deletion processing for erroneously learned image data (step S402 of FIG. 4), which is performed by the main control part 21 of the visual inspection device 2 according to the embodiment of the present invention. In FIG. 6, the main control part 21 of the visual inspection device 2 sets a defect threshold for detecting a defective portion (step S601).

The main control part 21 calculates a defect amount based on the set defect threshold (step S602). Specifically, a total (concentration integrated value) of difference concentration values of pixels determined as defective pixels (absolute values of values each obtained by deducting a pixel value of image data of the average image from a pixel value of a piece of image data stored in the non-defective item image data storing part 231, namely, the degree of separation from the average μ of the concentration value) is calculated as a defect amount.

The main control part 21 tests whether or not each of the calculated defect amounts is an outlier by statistical processing (step S603). In the present embodiment, both the parametric technique and the non-parametric technique are used, and the defect amount which is tested to be an outlier in the parametric technique and is also tested to be an outlier in the non-parametric technique is regarded as an outlier.

The main control part 21 displays and outputs outlier information for specifying an image whose defect amount has been tested to be the outlier (step S604).

The image inputting unit 71 accepts inputs of a plurality of images regarding non-defective items determined as non-defective items, which were acquired by capturing by the camera 1, and stores the images. That is, previously storing a plurality of images of items determined as non-defective items allows calculation of a threshold for the non-defective/defective determination. Image data regarding each image of an item determined as a non-defective item, whose input has been accepted, is stored into the non-defective item image data storing part 231 of the storage unit 23.

Figure 9:
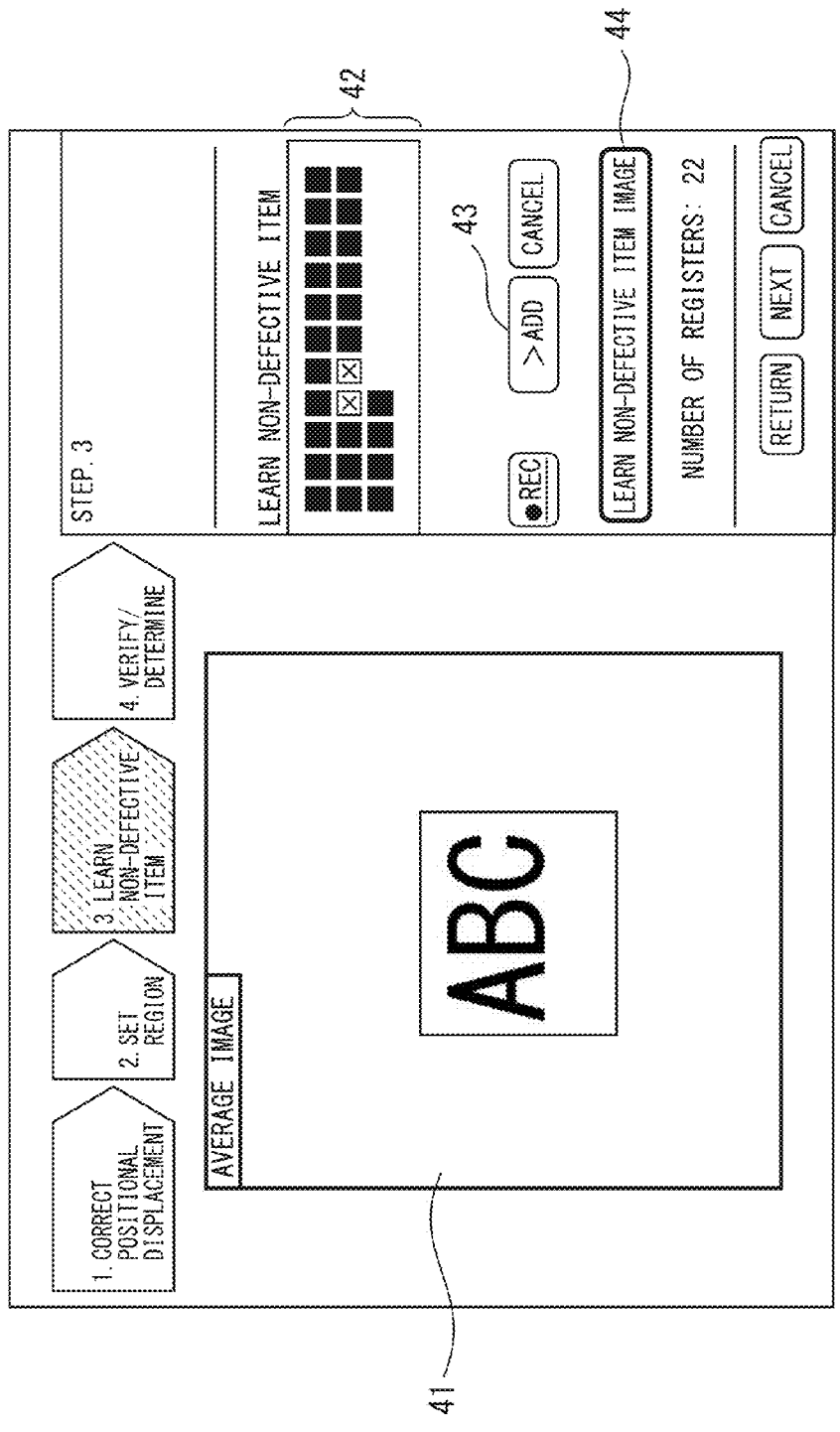
FIG. 9 is an exemplary view of a non-defective item image input accepting screen after the non-defective item learning processing in the visual inspection device according to the embodiment of the present invention.

FIG. 9 is an exemplary view of a non-defective item image input accepting screen after the non-defective item learning processing in the visual inspection device 2 according to the embodiment of the present invention. As shown in FIG. 9, in the present embodiment, a calculated average image is displayed in the image display region 41. Further, in the non-defective item learning result display region 42, an icon of "☐" mark which corresponds to an image whose defect amount has been tested not to be an outlier changes in display color, whereas icon of "☐" mark which corresponds to an image whose defect amount has been tested to be an outlier is displayed with an "x" mark. As described above, the image whose defect amount has been tested to be an outlier is clearly displayed, thereby allowing the user to specify and delete an image which may cause deterioration in accuracy in detecting a defective portion. Although an image is automatically deleted in accordance with the procedure described in FIG. 10 below in the present embodiment, the image whose defect amount has been tested to be an outlier may be deleted manually from the non-defective item image data storing part 231.

Figure 10:
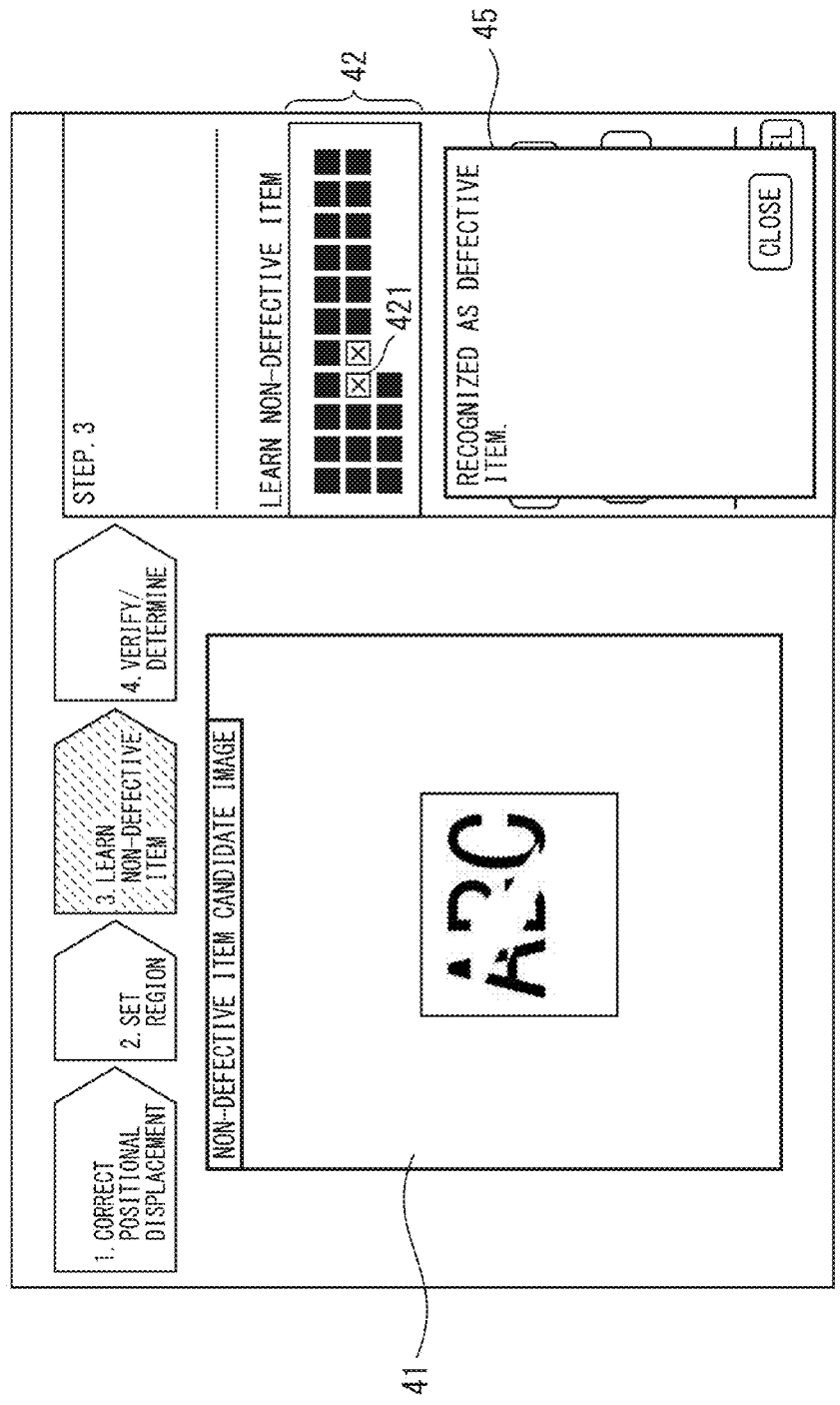
FIG. 10 is an exemplary view of a non-defective item image input accepting screen in the case of selecting an icon for a defective item in the visual inspection device according to the embodiment of the present invention.

FIG. 10 is an exemplary view of a non-defective item image input accepting screen in the case of selecting an icon for a defective item in the visual inspection device 2 according to the embodiment of the present invention. As shown in FIG. 10, when an "x"-marked icon 421 in the non-defective item learning result display region 42 is selected, an image corresponding to the icon 421 is displayed in the image display region 41. Simultaneously, a reason displaying region (reason displaying part) 45 is displayed as a pop-up screen, and a message indicating that it has been "RECOGNIZED AS DEFECTIVE ITEM" is displayed as a reason for the display of the "x" mark.

Further, image data of the image corresponding to the "x"-marked icon 421 is automatically deleted from the non-defective item image data storing part 231. This allows deletion of image data of an image of a defective item as shown in FIG. 10, the image data having been mixed into the non-defective item image data storing part 231, from the group of images of items regarded as non-defective items which sets the determination threshold. Although automatic deletion is performed in such a manner in the present embodiment, for example, a pop-up screen or the like may be displayed, and the user may be allowed to select whether or not to delete image data from the non-defective item image data storing part 231.

Figure 11:
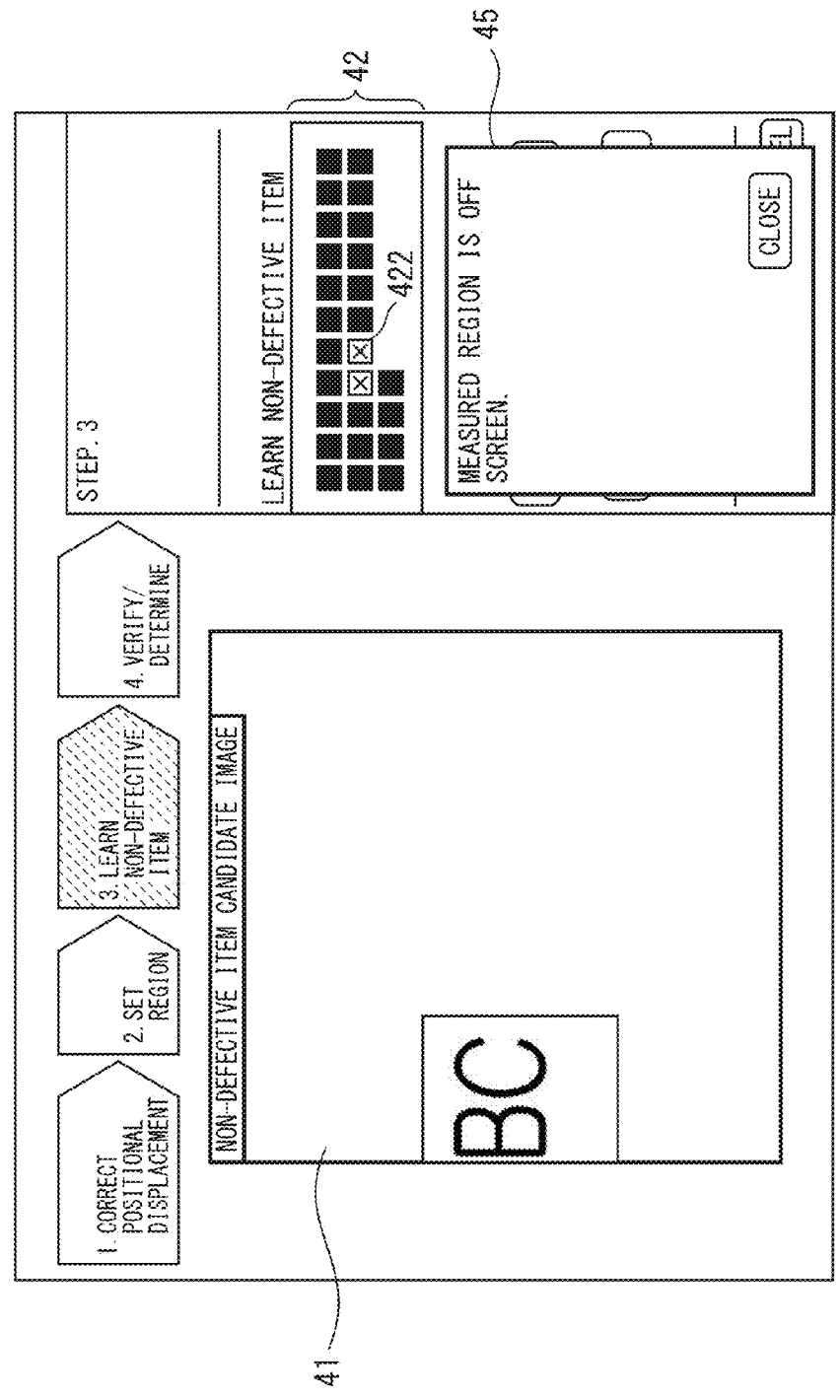
FIG. 11 is an exemplary view of a non-defective item image input accepting screen in the case of selecting an icon for another defective item in the visual inspection device according to the embodiment of the present invention.

Further, FIG. 11 is an exemplary view of a non-defective item image input accepting screen in the case of selecting an icon for another defective item in the visual inspection device 2 according to the embodiment of the present invention. As shown in FIG. 11, when an "x"-marked icon 422 in the non-defective item learning result display region 42 is selected, an image corresponding to the icon 422 is displayed in the image display region 41. In FIG. 11, the image lies off the image display region 41. Simultaneously, the reason displaying region 45 is displayed as a pop-up screen, and a message indicating that "MEASURED REGION IS OFF SCREEN" is displayed as a reason for the display of the "x"-marked icon 422.

Further, similarly to FIG. 10, image data of an image corresponding to the "x"-marked icon 422 is automatically deleted from the non-defective item image data storing part 231. This allows deletion of image data of an image of an item determined as a defective item as shown in FIG. 11, the image data having been mixed into the non-defective item image data storing part 231, from the group of images of items regarded as non-defective items which sets the determination threshold. Although automatic deletion is performed in such a manner in the present embodiment, for example, a pop-up screen or the like may be displayed, and the user may be allowed to select whether or not to delete image data from the non-defective item image data storing part 231.

Figure 12:
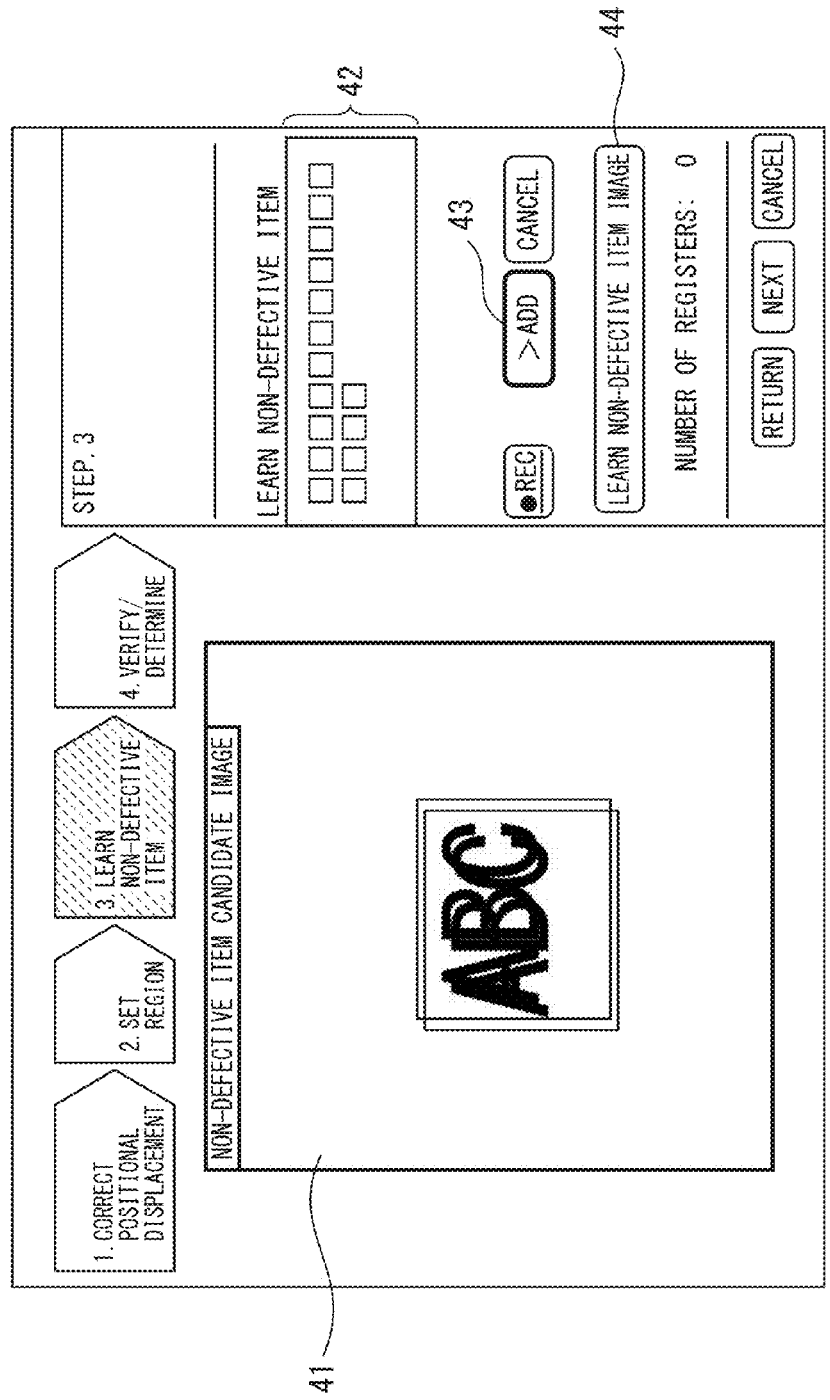
FIG. 12 is an exemplary view of a non-defective item image input accepting screen in the case of superimposing and displaying an image to serve as a standard for positional adjustment on an image whose input has been accepted in the visual inspection device according to the embodiment of the present invention.

When inputs of a plurality of images constituting the group of images of items regarded as non-defective items are accepted in the image inputting unit 71, an image to serve as a standard for positional adjustment may be superimposed and displayed on the image whose input has been accepted. FIG. 12 is an exemplary view of a non-defective item image input accepting screen in the case of superimposing and displaying an image to serve as a standard for positional adjustment on an image whose input has been accepted in the visual inspection device 2 according to the embodiment of the present invention.

As shown in FIG. 12, in the image display region 41, an image to serve as a standard for positional adjustment is displayed, and an image whose input has been accepted is superimposed and displayed with the image to serve as the standard for the positional adjustment. It is thereby possible to visually check the degree of positional displacement of the image whose input has been accepted with respect to the image to serve as the standard for the positional adjustment, so as to more reliably perform correction of positional displacement. Although the image to serve as the standard for the positional adjustment is displayed in the image display region 41 in the present embodiment, for example, an average image of the group of non-defective item images may be displayed.

Returning to FIG. 5, the threshold setting unit 72 also sets an upper limit of a defect amount as a determination threshold for making the non-defective/defective determination on the inspection object 6. Specifically, setting a value exceeding the upper limit of the defect amount which has been calculated based on a non-defective item image allows a non-defective item to be reliably determined as a non-defective item. Herein, the defect amount is calculated as a concentration integrated value obtained by summing up difference concentration values included in a continuous region whose concentration value is larger than the threshold in the image, namely, a blob.

Figure 13:
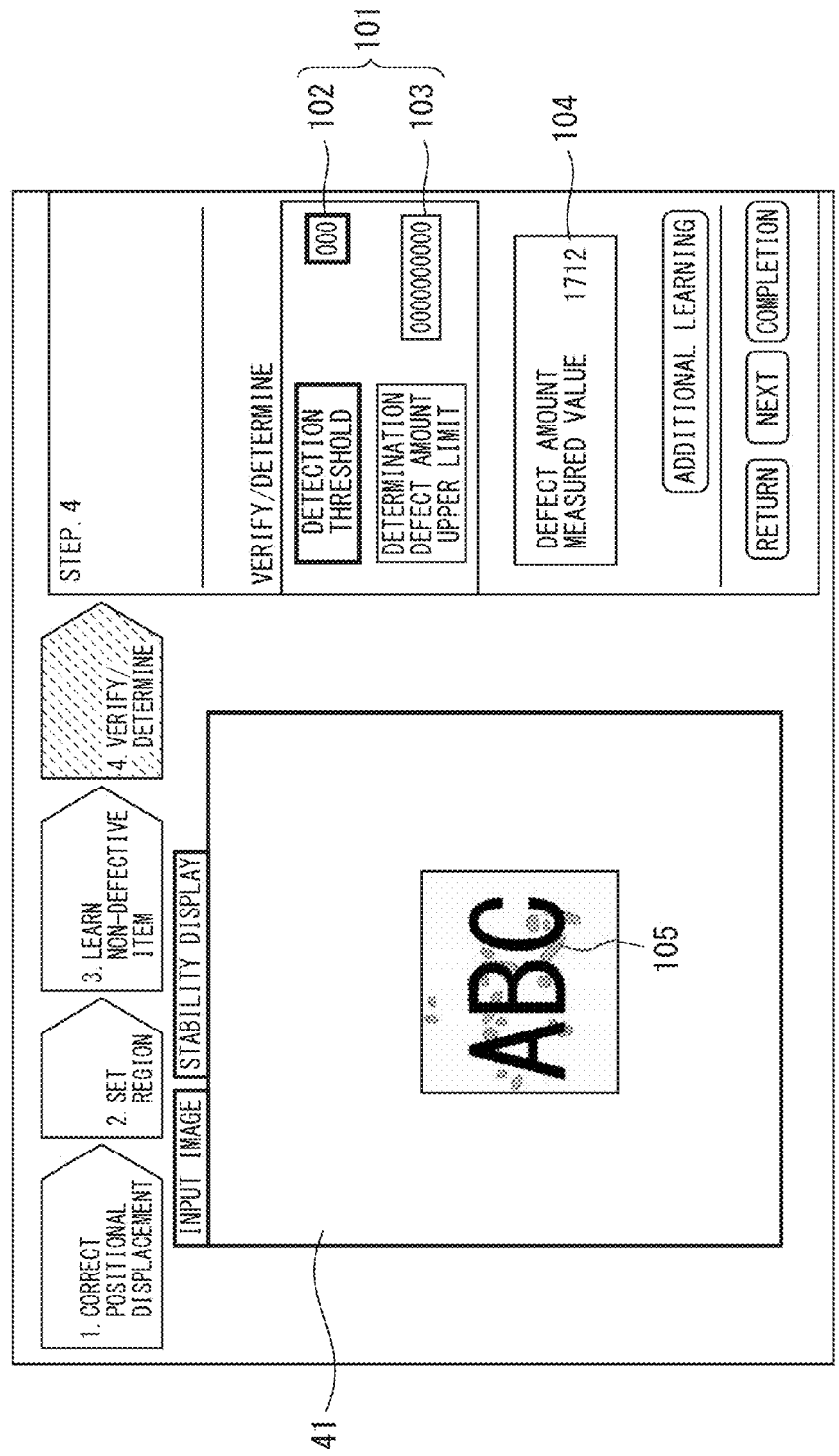
FIG. 13 is an exemplary view of a threshold setting screen in the visual inspection device according to the embodiment of the present invention in the case of a defect threshold and a determination threshold not being set.

FIG. 13 is an exemplary view of a threshold setting screen in the visual inspection device 2 according to the embodiment of the present invention in the case of a defect threshold and a determination threshold not being set. As shown in FIG. 13, a threshold setting region 101 is provided with a defect threshold setting region 102 for setting a defect threshold for detecting a defect, and an upper limit setting region 103 for setting an upper limit of a defect amount as a determination threshold. A "DETECTION THRESHOLD" shown in FIG. 13 refers to a value showing a fixed shift amount to be added to a portion of $3\sigma$ in the defect threshold $\mu \pm 3\sigma$. For example, when the "DETECTION THRESHOLD" is set to '10', the defect threshold is set to $\mu \pm (3\sigma+10)$. Further, a "DETERMINATION DEFECT AMOUNT UPPER LIMIT" shown in FIG. 13 is a determination threshold for making the non-defective/defective determination on the inspection object 6. For example, in the case of setting the "DETERMINATION DEFECT AMOUNT UPPER LIMIT" to '100', an OK determination is made when a defect amount calculated by the defect amount calculating unit is not larger than '100', and an NG determination is made when the defect amount calculated by the defect amount calculating unit exceeds '100'. In the example of FIG. 13, the "DETERMINATION DEFECT AMOUNT UPPER LIMIT" is set to '0', and an NG determination is made when the defect amount calculated by the defect amount calculating unit is not smaller than '1'. That is, although a defective portion 105 is displayed in the image display region 41 of FIG. 13, an NG determination is made regardless of a quantity of this defective portion 105. Further, in a defect amount displaying region (defect amount displaying part) 104, the defect amount calculated by the defect amount calculating unit is displayed.

Figure 14:
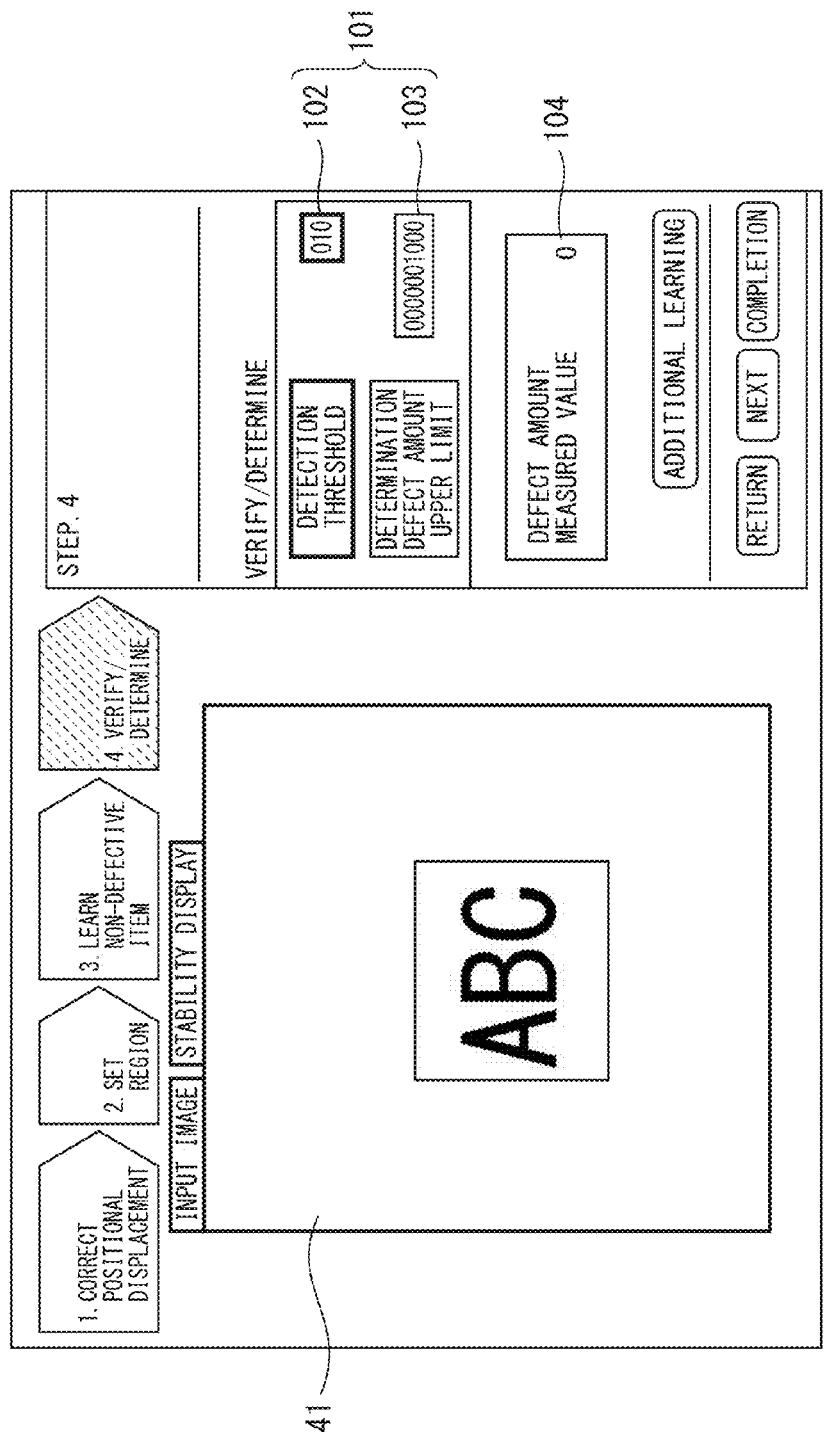
FIG. 14 is an exemplary view of a verification screen in the visual inspection device according to the embodiment of the present invention.

FIG. 14 is an exemplary view of a verification screen in the visual inspection device 2 according to the embodiment of the present invention. As shown in FIG. 14, when the defect threshold and the determination threshold are set in the defect threshold setting region 102 and the upper limit setting region 103, only a non-defective item image is displayed in the image display region 41 while the defective portion 105 is not displayed, and hence an OK determination is made.

Figure 15:
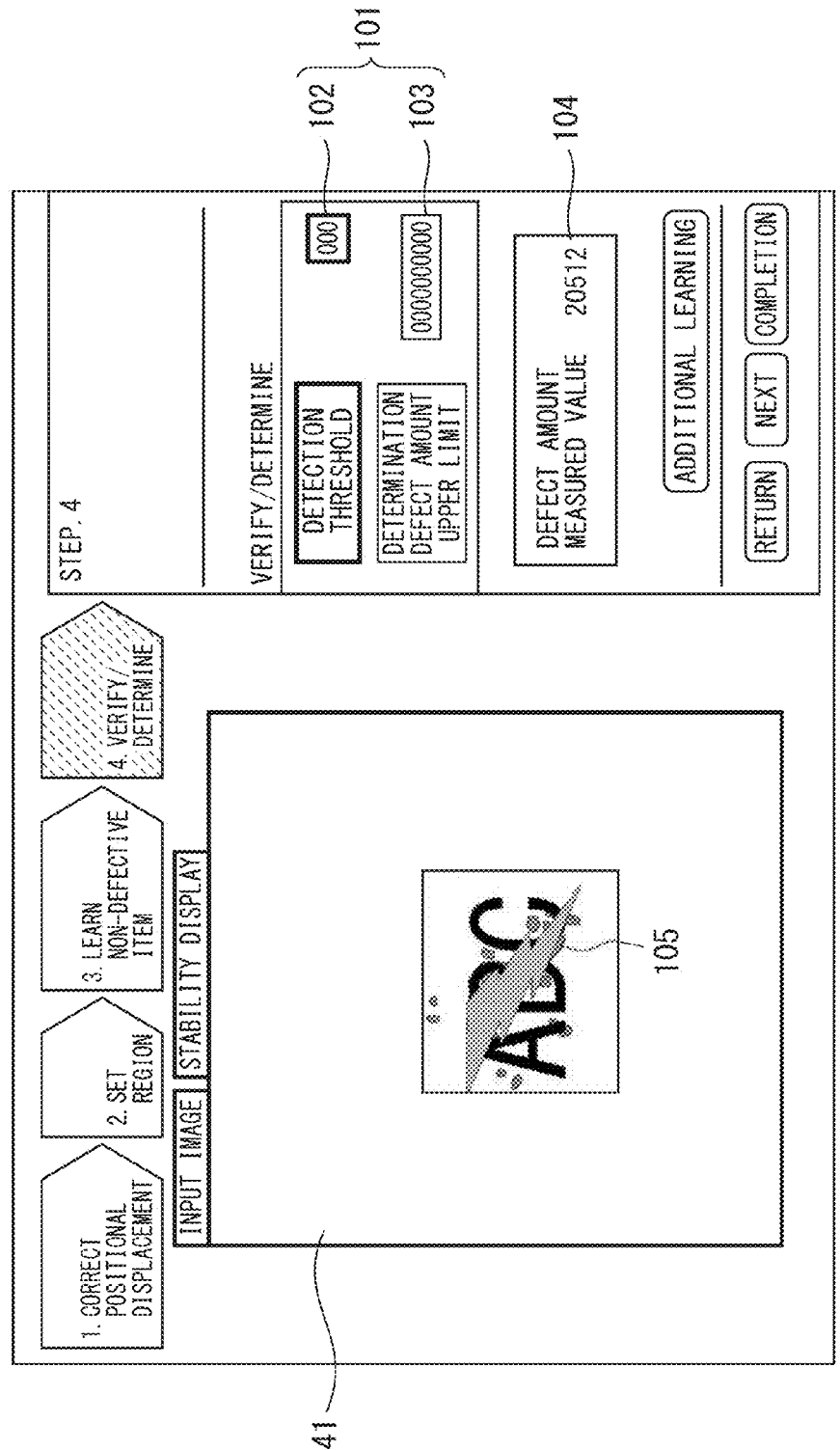
FIG. 15 is an exemplary view of a verification screen in the visual inspection device according to the embodiment of the present invention.

Further, in the case of a defective item image, the upper limit of the defect amount is adjusted as the determination threshold, and hence it is possible to clearly show where the defective portion is. FIG. 15 is an exemplary view of a verification screen in the visual inspection device 2 according to the embodiment of the present invention.

As shown in FIG. 15, when the defect threshold and the determination threshold are not set in the defect threshold setting region 102 and the upper limit setting region 103, the defective portion 105 is also displayed with respect to the defective item image in the image display region 41. Further, in the defect amount displaying region 104, the calculated defect amount is displayed. Accordingly, display/non-display of the defective portion 105 can be switched by changing (updating) the setting of the defect threshold (detection threshold).

Figure 16:
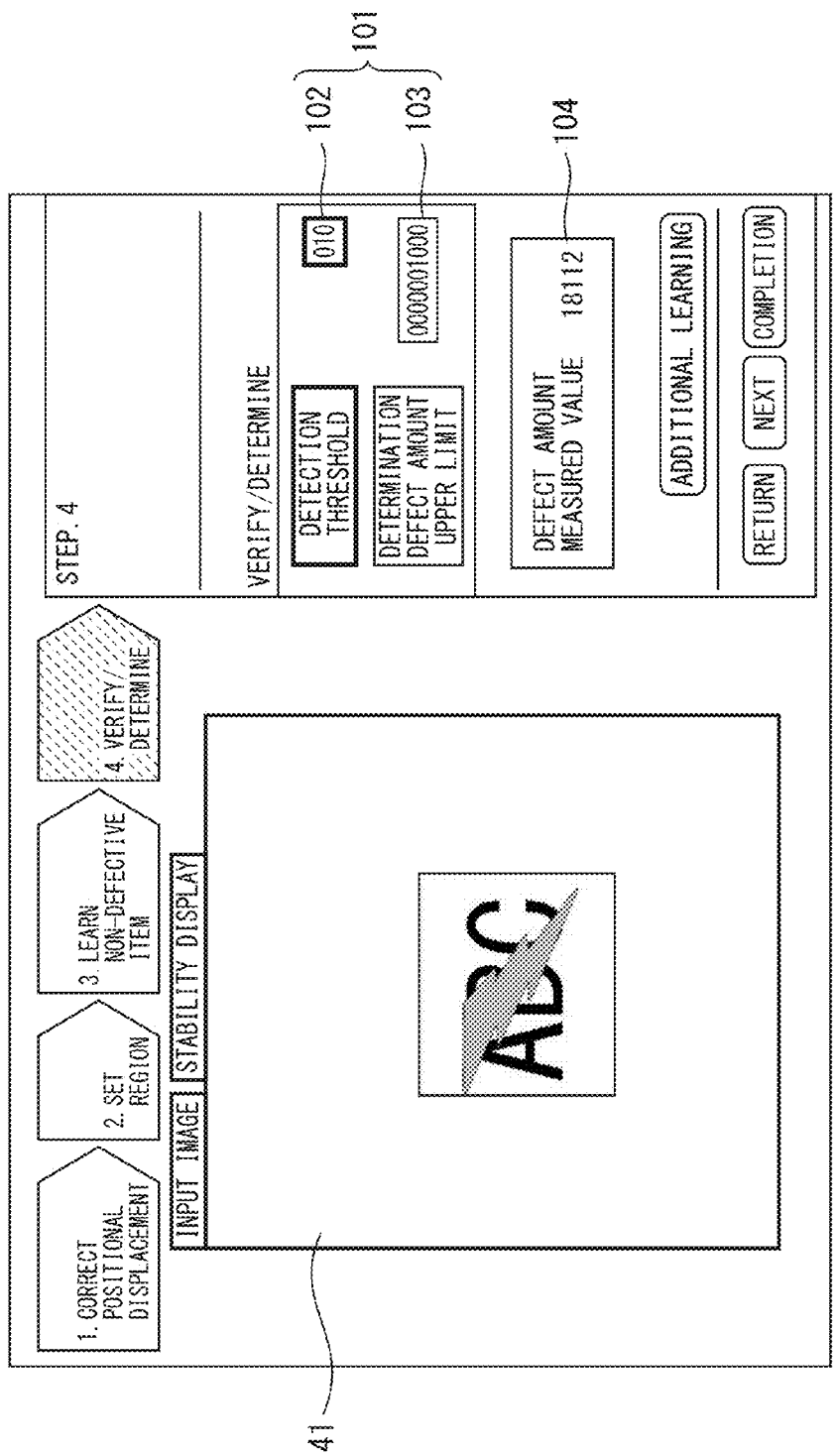
FIG. 16 is an exemplary view of a verification screen in the visual inspection device according to the embodiment of the present invention.

FIG. 16 is an exemplary view of a verification screen in the visual inspection device 2 according to the embodiment of the present invention. As shown in FIG. 16, when the defect threshold and the determination threshold are set in the defect threshold setting region 102 and the upper limit setting region 103, the defective portion 105 is displayed with respect to a defective item image in the image display region 41, and hence an NG determination is made. However, a defective portion having a concentration not larger than the set defect threshold is not displayed. Hence it is possible to visually check where a defective portion is, while deleting a noise component which is not larger than the defect threshold and not the defective portion.

Returning to FIG. 3, the defective item image storing unit 73 stores a defective item image which is an image of an item determined as a defective item into a defective item image data storing part 232 of the storage unit 23. The stored defective item image is used for checking whether or not a defective item image is an image of an item non-erroneously determined as a defective item.

Based on the non-defective item image data stored in the non-defective item image data storing part 231 as non-defective item images which include image data of an image whose inputs has newly been accepted, the threshold resetting unit 74 recalculates the average image and the standard deviation image, to recalculate the defect threshold. The threshold resetting unit 74 also statistically recalculates the upper value of the defect amount as the determination threshold for making the non-defective/defective determination on the inspection object 6.

When accepting an input of an image newly acquired by capturing the inspection object 6, the non-defective/defective determination unit 75 re-detects a defective portion based on the defect threshold for detecting a defective portion which has been reset by the threshold setting unit 72 performing non-defective item learning processing by use of a plurality of stored images including the image whose input has been accepted, and determines whether or not the stored defective-item image is an image of a defective item.

Specifically, based on the set defect threshold, a defective portion of each of the plurality of images of items determined as non-defective items is detected, the image being stored including the newly acquired image. In the present embodiment, first detection of a defective portion is performed based on an initial value of the defect threshold. Second or subsequent detection of a defective portion is performed based on an automatically set defective portion. The defect amount is calculated as a concentration integrated value obtained by summing up difference concentration values included in a continuous region (blob) whose concentration value is larger than the defect threshold in the image out of the detected defective portions. Since the defect amount is calculated as a concentration integrated value included in the blob, even if a defect has a defect amount smaller than the defect threshold but extends in a wider range, it can be detected as a defective portion.

Figure 17:
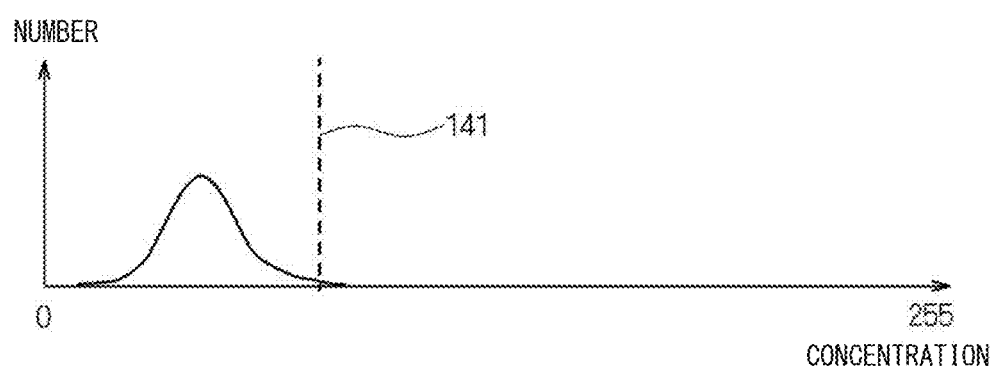
FIG. 17 is an exemplary view of a histogram of concentration values in the visual inspection device according to the embodiment of the present invention.

In order to calculate the defect threshold for detecting a defect, first, a plurality of defective portions are detected by use of the set defect threshold, and a histogram of concentration values is acquired with respect to each of the plurality of defective portions. Herein, the maximum concentration value within the blob is regarded as a concentration value of each blob. FIG. 17 is an exemplary view of a histogram of concentration values in the visual inspection device 2 according to the embodiment of the present invention.

In the example of FIG. 17, a horizontal axis indicates concentration values of 0 to 255, and a vertical axis indicates the number of blobs having respective concentration values. A blob attributable to noise or the like other than a defect has a small concentration value. Hence, setting a defect threshold 141 as the defect threshold can prevent detection of the blob attributable to noise or the like as a defective portion. As for the concentration, a distribution in an area of the blob is acquired and similar statistical processing is adopted to set a threshold with respect to the area, thereby also allowing deletion of a noise component.

The defect threshold 141 is calculated based on statistical processing. In the present embodiment, a Smirnov-Grubbs test is adopted as the parametric technique which is premised that a concentration value to serve as an object for the statistical processing follows a regular distribution, and a test using a box-and-whisker plot is adopted as the non-parametric technique which is premised that the defect amount does not follow the regular distribution. Naturally, the present invention is not limited to the use of the regular distribution, but a probability distribution such as a t-distribution, an $\chi^2$-distribution, a Poisson distribution, or a binomial distribution may be used. In the present embodiment, both the parametric technique and the non-parametric technique are used.

In the Smirnov-Grubbs technique, an average value of concentration values X is taken as an X-bar, the maximum value thereof as Xi, and a standard deviation thereof as a, and a significant point t corresponding to a significant level of $\alpha\%$ is obtained from a statistics table, to calculate a threshold Xi by use of a third formula in (Equation 1).

[Mathematical Formula 1]

$$\begin{cases} T_i \geq t \\ T_i = \dfrac{X_i - \overline{X}}{\sigma} \end{cases} \quad \text{(Equation 1)}$$

$$\overline{X} + \sigma t \leq X_i$$

The threshold Xi calculated by (Equation 1) is automatically set in the defect threshold setting region 102, and by executing visual inspection again on an image whose input has been newly accepted, it is possible to check whether or not the automatically set threshold is appropriate.

Further, when the concentration value X does not follow the regular distribution, the defect threshold is calculated by use of the box-and-whisker plot. When the number of defective portions is N (N is a natural number), a concentration value corresponding to the N/4-th from the smallest is obtained as a first quartile point (25% point), and a concentration value corresponding to the 3N/4-th is obtained as a third quartile point (75% point). Then, an IQR (Interquartile Range) is calculated as a difference between the third quartile point (75% point) and the first quartile point (25% point).

Figure 18:
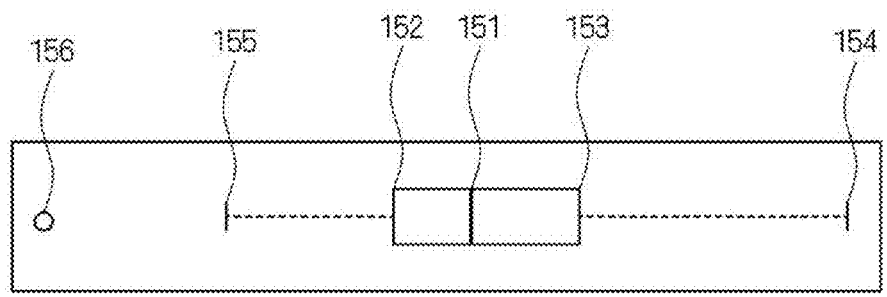
FIG. 18 is an explanatory view in the case of testing presence or absence of an outlier by use of a box-and-whisker plot in the visual inspection device according to the embodiment of the present invention.

The box-and-whisker plot refers to a plot displaying a range from the first quartile point (25% point) to the third quartile point (75% point) with a median of the concentration value X placed therebetween in the shape of a "box", and displaying ranges from the first quartile point (25% point) and the third quartile point (75% point) to the upper limit threshold and the lower limit threshold respectively in the shape of a "whisker". FIG. 18 is an explanatory view in the case of testing the presence or absence of an outlier by use of a box-and-whisker plot in the visual inspection device 2 according to the embodiment of the present invention.

As shown in FIG. 18, a range from a first quartile point (25% point) 152 to a third quartile point (75% point) 153 with a median 151 of the concentration value X placed therebetween is illustrated in the shape of a "box". For example, with an upper limit threshold 154 taken as (third quartile point+3×IQR) and a lower limit threshold 155 taken as (first quartile point−3×IQR), a range from the third quartile point 153 to the upper limit threshold 154 and a range from the lower limit threshold 155 to the first quartile point 152 are displayed each by a dotted line in the shape of a "whisker". Naturally, a coefficient, by which the IQR is multiplied, is not limited to '3', but it may be '1.5' for performing testing on a stricter condition, or may be changed in accordance with a standard for detecting a defective portion. When the value is smaller than the lower limit threshold 155 or larger than the upper limit threshold 154, for example, an outlier 156 can be detected as a defective portion.

In the present embodiment, only one-sided testing may be performed which determines only a blob having a large concentration value to be a defective portion, and hence the upper limit threshold 154 (third quartile point+3×IQR) is calculated as the defect threshold.

Based on the recalculated defect threshold, a defective portion of each of the stored images is re-detected, to calculate a defect amount of the re-detected defective portion. Specifically, a total (concentration integrated value) of difference concentration values of pixels determined as defective pixels (absolute values of values each obtained by deducting a pixel value of image data of the average image from a pixel value of a piece of image data stored in the non-defective item image data storing part 231, namely, the degree of separation from the average μ of the concentration value) is calculated as a defect amount. Thereby, for example, when there are 30 pieces of non-defective item image data, 30 defect amounts are calculated.

Although a total of difference concentration values of pixels determined to be defective pixels is calculated as a defect amount in the present embodiment, a variety of other calculation methods can be considered. For example, it may be calculated as a total of concentration volumes of a blob (region made up of a plurality of defective pixels) detected in the region to be inspected, which has been set in step S302 of FIG. 3. That is, a continuous region whose concentration value is larger than the defect threshold in the region to be inspected is recognized as a blob and a defect amount is calculated as a concentration integrated value obtained by summing up difference concentration values included in the blob. In the case of using the difference concentration value, a portion which extends in a broad range but has a low concentration is unlikely to be detected as a defective portion. In the present embodiment, such a defective portion can be reliably detected by use of the concentration integrated value.

Further, the concentration integrated value may not be used, but a total of concentration values of pixels determined as defective pixels or a total of concentration values of a blob detected as a defective portion may simply be calculated as a defect amount. The maximum concentration value out of the concentration values of pixels determined as defective pixels may be regarded as a defect amount. In short, as long as the defect amount is a numerical value that can be compared with the determination threshold for making the non-defective/defective determination on the inspection object 6, the defect amount may be a defect concentration value indicating the degree of separation from the defect threshold, or may be a defective area indicating a pixel or an area of a blob over the defect threshold, or may be the defect concentration volume obtained by multiplying the defect concentration value by the defective area.

Figure 19:
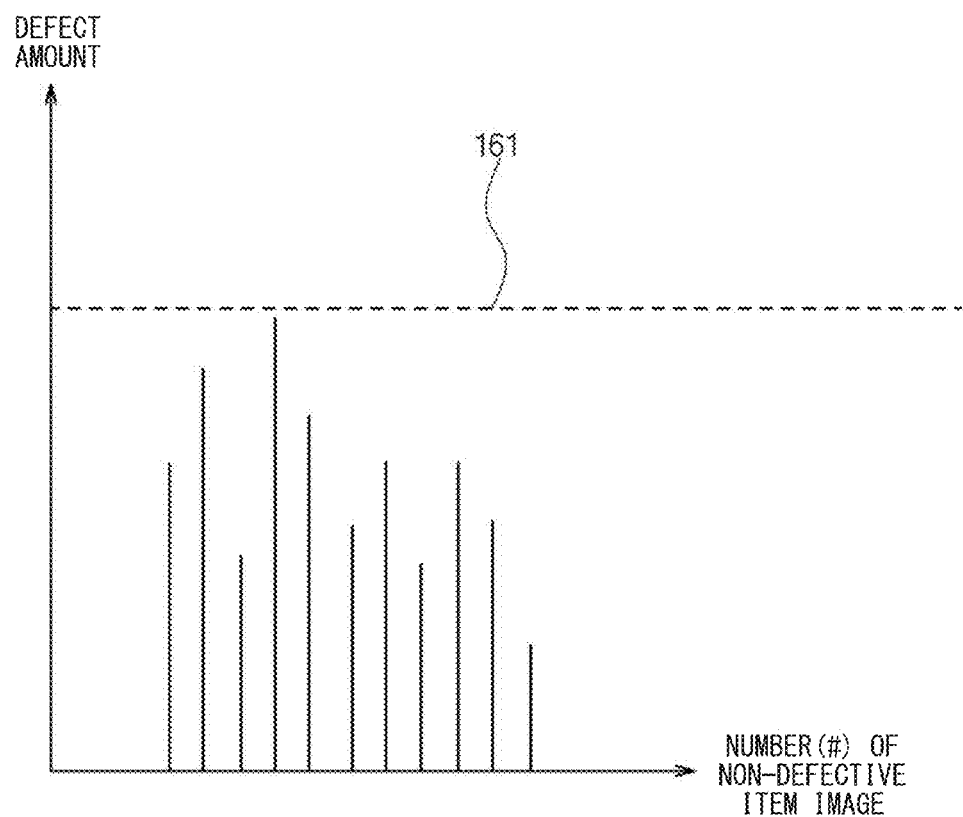
FIG. 19 is an illustrative view showing the relation between a distribution of calculated defect amounts and a determination threshold.

A frequency distribution of concentration values of defective portions is then acquired, to recalculate a new determination threshold by statistical processing by use of the acquired frequency distribution. FIG. 19 is an illustrative view showing the relation between calculated defect amounts and a determination threshold. As shown in FIG. 19, a defect amount is calculated per non-defective item image, and the maximum value of the calculated defect amount or a statistically calculated value 161 which is larger than the maximum value is set as the determination threshold, thereby allowing items in images stored as non-defective items to be all determined as non-defective items.

The determination threshold is calculated in a manner similar to the defect threshold. First, a histogram of defect amounts each calculated per non-defective item image is acquired. In the Smirnov-Grubbs technique, an average value of defect amounts Y is taken as an Y-bar, the maximum value thereof as Yi, and a standard deviation thereof as a, and a significant point t corresponding to a significant level of α % is obtained from a statistics table, to calculate a threshold Yi by use of a third formula of (Equation 2).

[Mathematical Formula 2]

$$\begin{cases} T_i \geq t \\ T_i = \dfrac{Y_i - \overline{Y}}{\sigma} \end{cases} \quad \text{(Equation 2)}$$

$$\overline{Y} + \sigma t \leq Y_i$$

The upper limit value Yi calculated by (Equation 2) is automatically set as the determination threshold in the upper limit setting region 103, and by executing visual inspection again on an image whose input has been newly accepted, it is possible to check whether or not the automatically set determination threshold is appropriate.

Further, when the defect amount Y does not follow the regular distribution, the determination threshold is calculated by use of the box-and-whisker plot. When the number of defective portions is N (N is a natural number), a defect amount corresponding to the N/4-th from the smallest is obtained as a first quartile point (25% point), and a defect amount corresponding to the 3N/4-th is obtained as a third quartile point (75% point). Then, an IQR (Interquartile Range) is calculated as a difference between the third quartile point (75% point) and the first quartile point (25% point).

In the present embodiment, since only one-sided testing is satisfactorily performed in which an item in only an image with a large defect amount is determined as a defective item, the upper limit threshold (third quartile point+3×IQR) is calculated as the determination threshold.

As described above, although a new determination threshold is statistically calculated in the present embodiment, the present invention is not limited thereto, and when a defect amount such as one being an outlier is not calculated in the frequency distribution shown in FIG. 19, the maximum value of the defect amount in the frequency distribution shown in FIG. 19 may be set as the determination threshold. Further, a fixed margin may be held from the maximum value of the defect amount, and a defect amount larger than the maximum value of the defect amount just by a predetermined amount may be set as the determination threshold. In short, based on a frequency distribution of the acquired defect amounts, a new determination threshold may be calculated and set.

Whether or not the defect threshold and the determination threshold as thus recalculated are appropriate is verified by use of a defective item image. First, defective item images stored in the defective item image data storing part 232 are sequentially displayed, and inputs as to whether or not items in these images are actually defective items are accepted. Specifically, when visual inspection is performed on the inspection object 6 in the operation mode, an NG determination is made on some images of the inspection objects 6. The user visually checks the plurality of images of items determined as NG on the display device 3 and classifies these images between an image of an item that may be determined as NG without any problem and an image desired to be added to the image group (learning data) regarding non-defective items, namely, an image desired to be additionally learned, for the reason that the NG determination has been made due to noise, or for some other reason. Hereinafter, there will be described examples of a screen to display an image desired to be additionally learned.

Figure 20:
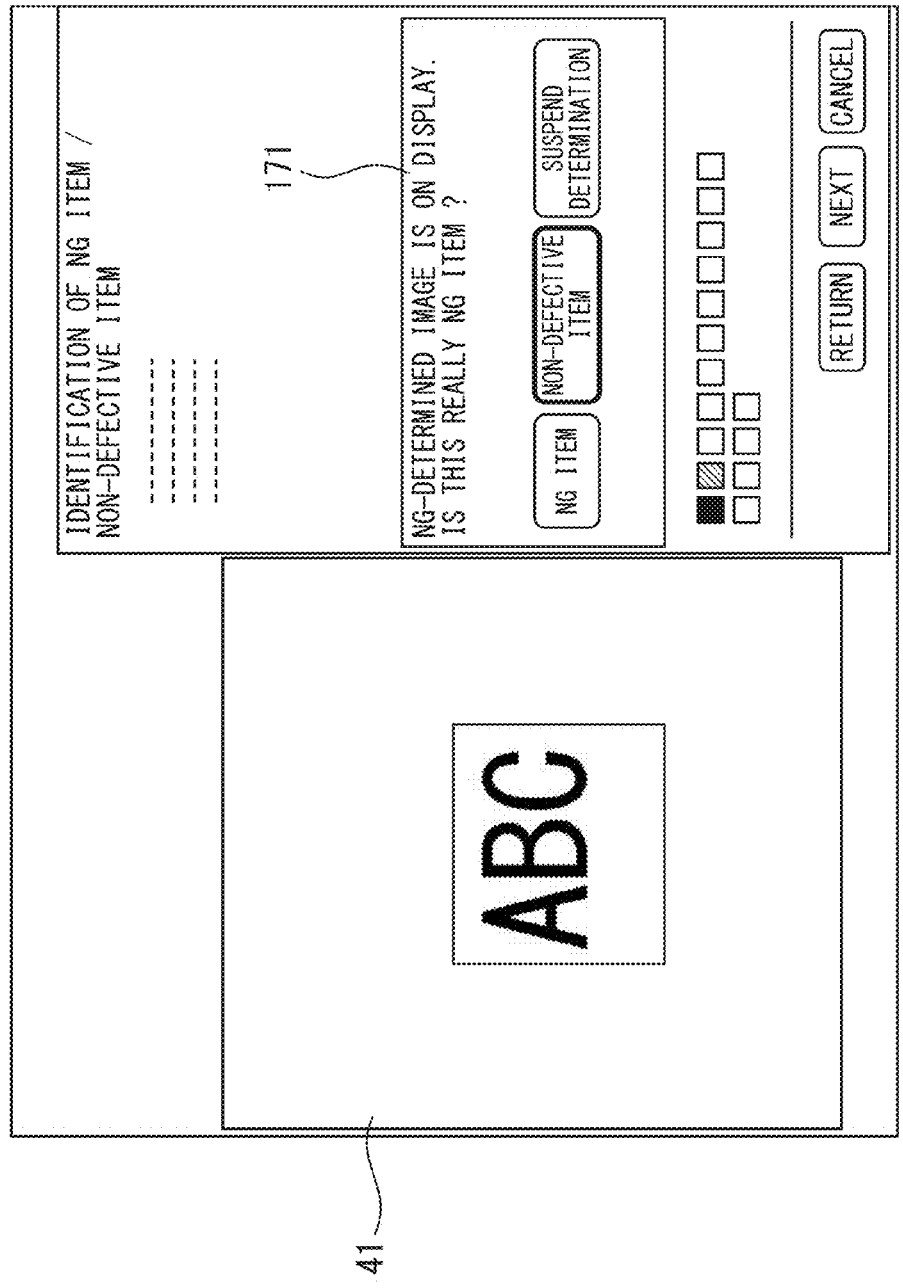
FIG. 20 is an exemplary view of a non-defective item/defective item determination screen in the visual inspection device according to the embodiment of the present invention.
Figure 21:
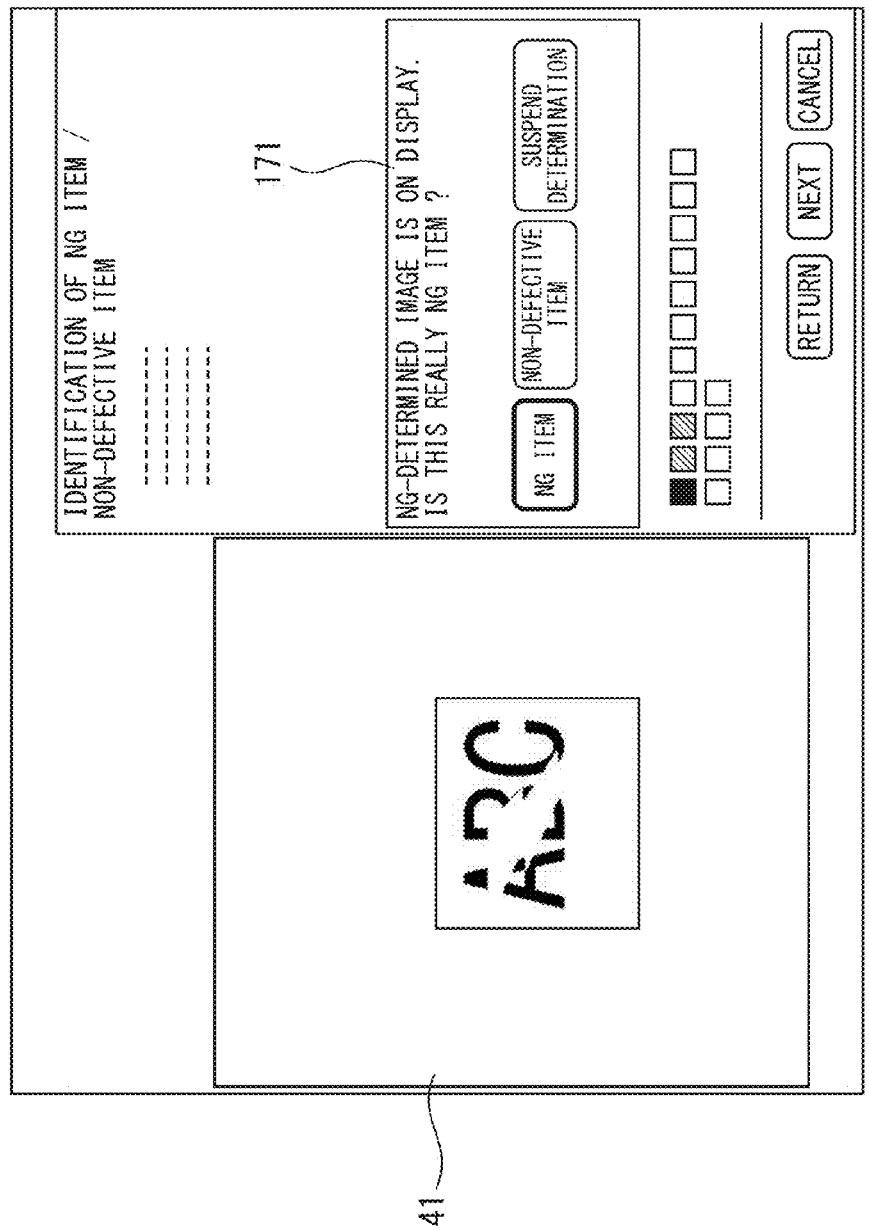
FIG. 21 is an exemplary view of a non-defective item/defective item determination screen in the visual inspection device according to the embodiment of the present invention.

FIGS. 20 and 21 are exemplary views of non-defective item/defective item determination screens in the visual inspection device 2 according to the embodiment of the present invention. The screen examples shown in FIGS. 20 and 21 are provided to the user as utility screens on the display device 3 after the mode shift from the operation mode to the setting mode. When the user selects a button such as a "VERIFY NG ITEM" button displayed on the display device 3, for example, a plurality of images of items which were determined as NG as described above are displayed on the display device 3. The display mode is not particularly limited, and the images may be displayed one by one by the user's operation, or may be listed and displayed in a thumbnail form.

FIG. 20 shows a case where there is an image of an item which has been determined as NG in the operation mode but is desired by the user to be treated as a non-defective item. In this case, a selection of a "NON-DEFECTIVE ITEM" button is accepted in a determination inputting screen 171 with respect to an image displayed in the image display region 41, to thereby allow storing of a non-defective item image mixed with defective item images as an image of a non-defective item. That is, an image displayed in the image display region 41 is additionally stored into the non-defective item image data storing part 231, thereby allowing additional learning FIG. 21 shows a case where there is an image of an item which has been determined as NG in the operation mode (or setting mode) and is desired by the user to be treated as a defective item. A selection of an "NG ITEM" button is accepted in a determination inputting screen 171 with respect to the displayed defective item image, to thereby regard the image as an image of a defective item and delete it from targets for non-defective item learning processing. That is, an image displayed in the image display region 41 is not additionally stored into the non-defective item image data storing part 231, thereby allowing deletion of the image from targets for additional learning.

Then, in the present embodiment, when the selection of the "NON-DEFECTIVE ITEM" button is accepted, non-defective item learning processing is automatically performed. That is, the main control part 21 performs the foregoing non-defective item learning processing as additional learning, including the image added to the non-defective item images. However, in order to avoid a situation in which, due to additional learning, an image of an item which should essentially be determined as a defective item is determined as a non-defective item, or a situation in which an image comes into a state unintended by the user and cannot be restored to its original state, the backup unit 77 shown in FIG. 5 stores information regarding non-defective item learning processing as a backup into the storage unit 23 before additional learning. Examples of the information regarding non-defective item learning processing may include information regarding an image used in non-defective item learning processing, calculated defect threshold, and determination threshold (upper limit of the defect amount) (collectively referred to as learning data).

Although the backup unit 77 stores learning data as a backup file into the storage unit 23 in the present embodiment, for example, a nonvolatile memory or the like is used as the storage unit 23, and data such as the defect threshold out of the learning data is deployed to a volatile memory such as a RAM. Thereby, information regarding learning processing is constantly stored within the nonvolatile memory. Thus, data stored within the nonvolatile memory is kept in a pre-learning state, eliminating the need to perform processing of creating a backup file.

Further, a variety of types of information can be considered as "information regarding learning processing". For example, (1) when it is assumed that 10 pieces of image data of non-defective item images are stored in the non-defective item image data storing part 231 before additional learning, the above information may be all of the 10 pieces of image data of non-defective item images. In this case, when the data becomes learning data unintended by the user after additional learning, an average value of each pixel and a defect threshold from a standard deviation may be recalculated by use of the 10 pieces of image data, to thereby return the data to its original state.

However, a memory used capacity becomes larger as the number of non-defective item images increases. Thereat, for example, (2) a total number P of pixel values obtained by adding pixel values of the respective pixels of the non-defective item images may be calculated per pixel, while a value Q obtained by adding all the square of each of concentration values of the 10 non-defective item images may be calculated per pixel, and the number (10) of non-defective item images, the total P and the value Q may be regarded as the "information regarding learning processing". In this case, when the data becomes learning data unintended by the user after additional learning, the concentration value of each pixel of the total P may be divided by 10 to calculate an average value per pixel, while a standard deviation may be calculated per pixel by use of the total P and the value Q, to thereby return the data to its original state.

When the foregoing restoring processing is performed every time, there may occur a case where considerable time is required for arithmetic processing. Thereat, for example, (3) an average value and a standard deviation ($\mu \pm 3\sigma$), namely, a defect threshold, may be previously calculated from 10 pieces of image data, and this may be regarded as the "information regarding learning processing". In this case, when the data becomes learning data unintended by the user after additional learning, the data may be returned to its original state by use of the previously stored defect threshold.

In short, the "information regarding learning processing" is information for calculating the average value and the standard deviation per pixel of a plurality of image data stored in the non-defective item image data storing part 231. As in the foregoing (2) and (3), the number (10) of non-defective item images, the total P, the value Q, and the defect threshold obtained from the 10 pieces of image data are preferably regarded as the "information regarding learning processing".

Figure 22:
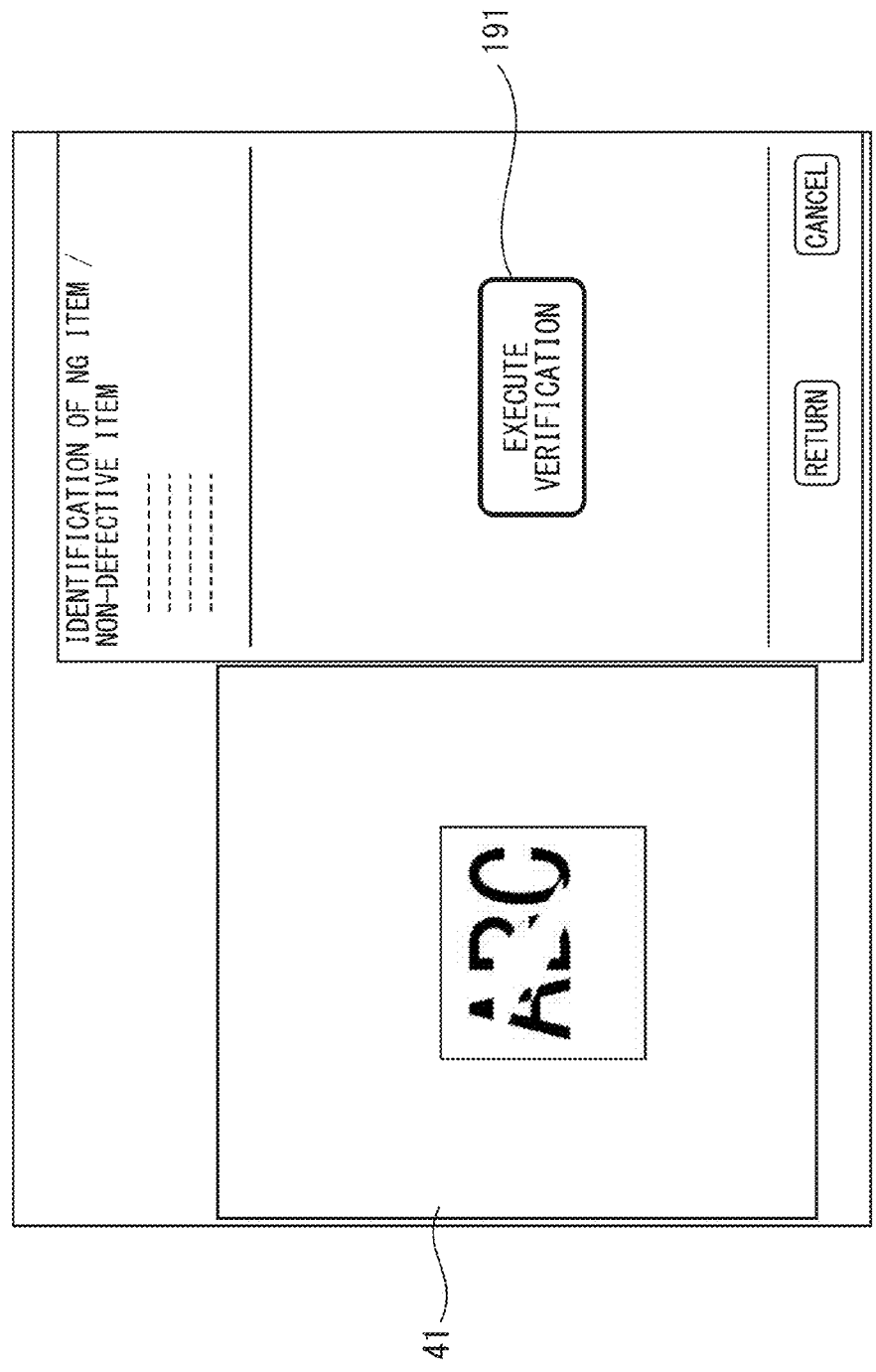
FIG. 22 is an exemplary view of a verification screen by use of a defective item image in the visual inspection device according to the embodiment of the present invention.

Returning to FIG. 5, the determination result displaying unit 76 displays an image of an item which has been determined as NG in the operation mode but is desired by the user to be treated as a non-defective item, as shown in FIG. 20. In the present embodiment, a screen is displayed for checking whether or not an erroneous determination (OK determination) has not been made on an item which should essentially be determined as a defective item due to additional learning after performance of additional learning as described above. FIG. 22 is an exemplary view of a verification screen by use of a defective item image in the visual inspection device 2 according to the embodiment of the present invention.

As shown in FIG. 22, any of images additionally learned in FIG. 20 is displayed in the image display region 41, and a selection of an "EXECUTE VERIFICATION" button 191 is accepted. When the selection of the "EXECUTE VERIFICATION" button 191 is accepted, a non-defective/defective determination is made by use of the defect threshold and the determination threshold updated by additional learning. Although any of images additionally learned in FIG. 20 is displayed in the image display region 41, all of the additionally learned images may, for example, be listed and displayed by use of a thumbnail image or the like. Further, in the present embodiment, the verification screen shown in FIG. 22 is displayed after additional learning is repeated once or more than once in FIG. 20, but the present invention is not particularly limited thereto. For example, in FIG. 20, the verification screen shown in FIG. 22 may be displayed each time additional learning is performed, to perform verification by use of the defective item image.

Figure 23:
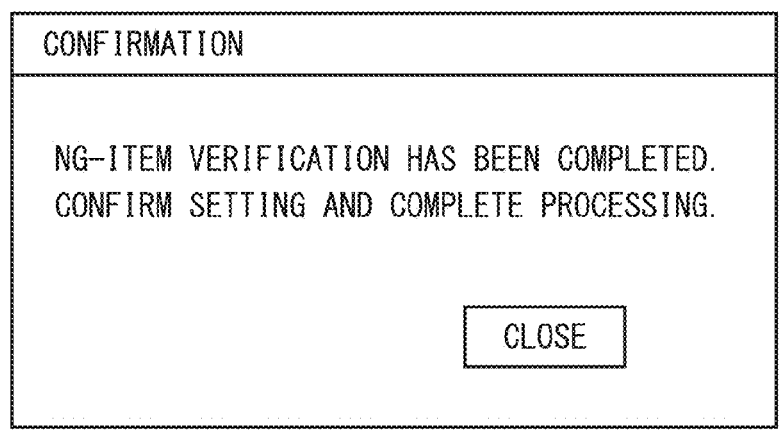
FIG. 23 is an illustrative view of a message which is shown in the case of an NG determination having been appropriately made in the visual inspection device according to the embodiment of the present invention.

When verification using the defective item image is successfully performed, namely, when an NG determination is appropriately made as a result of performing a non-defective/defective determination on the defective item image by use of a defect threshold and a determination threshold which were newly set by additional learning, a message indicating this determination is displayed. FIG. 23 is an illustrative view of a message which is displayed in the case of the NG determination having been appropriately made in the visual inspection device 2 according to the embodiment of the present invention. As shown in FIG. 23, a message indicating that the defect threshold, the determination threshold, and the like reset by additional learning have been appropriate is displayed and outputted.

Figure 24A:
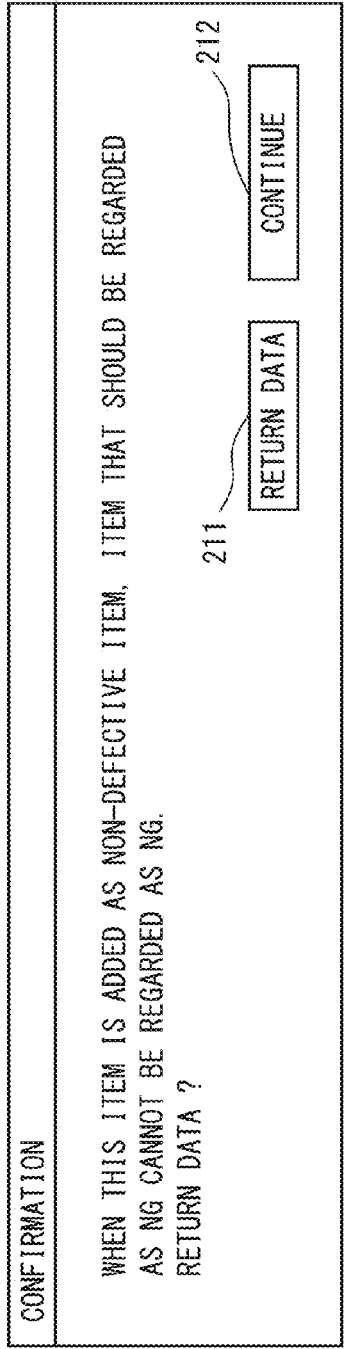
FIGS. 24A and 24B are illustrative views of messages which are shown in the case of an erroneous determination having been made in the visual inspection device according to the embodiment of the present invention.
Figure 24B:
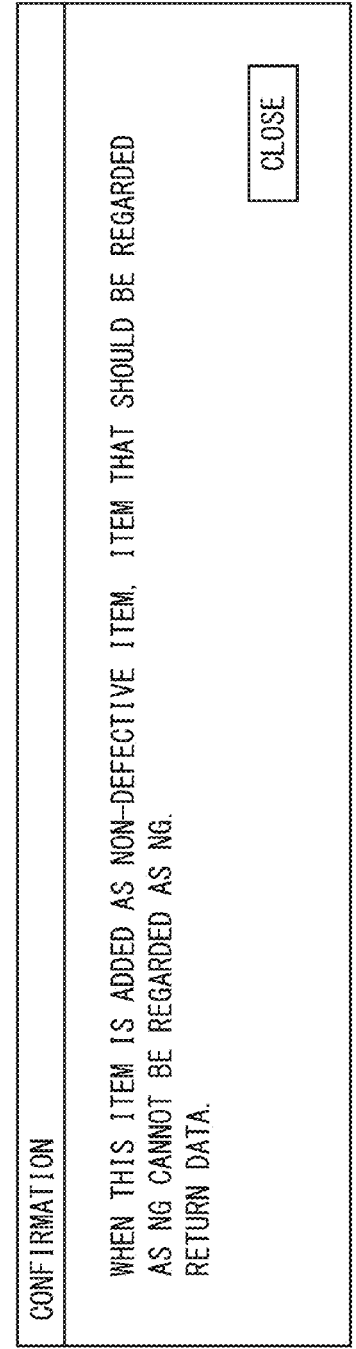

On the other hand, when verification using the defective item image is unsuccessfully performed, namely, when an OK determination (erroneous determination) is made as a result of performing a non-defective/defective determination on the defective item image by use of a defect threshold and a determination threshold newly set by additional learning, a message indicating the determination is displayed and outputted. FIGS. 24A and 24B are illustrative views of messages which are displayed in the case of an erroneous determination having been made in the visual inspection device 2 according to the embodiment of the present invention.

As shown in FIGS. 24A and 24B, there are two types of messages in the case of the erroneous determination. As shown in FIG. 24A, when the user is an administrator, there are displayed a "BACK" button 211 which can return data to the stored learning data by the backup unit 77 shown in FIG. 5, and a "CONTINUE" button 212 which can continue the processing without returning the data to the state before additional learning (selection accepting unit 82). When a selection of the "BACK" button 211 is accepted, the learning data stored in the storage unit 23 is read out, and the data can be returned to the state where the non-defective item learning processing is performed without including the image displayed this time, namely, the state before additional learning is performed on the screen shown in FIG. 20.

On the other hand, when a selection of the "CONTINUE" button 212 is accepted, the processing continues without returning the data to the state before additional learning. In such a manner, it is considered that, when the user is an administrator, the current state in which the erroneous determination has temporarily been made can be resolved by updating setting of another parameter or the like, and hence the selection of the "BACK" button 211 or the "CONTINUE" button 212 can be accepted.

When the user is an operator as shown in FIG. 24B, since the operator is not qualified for updating setting of another parameter or the like, an operation similar to an operation performed when the "BACK" button 211 is forcedly pressed, namely, an operation to return the data to the state before additional learning, may be performed and the defect threshold may be updated to a defect threshold with which an image of an item that should essentially be determined as a defective item is determined as a non-defective item, due to inadvertent additional learning by the operator. As described above, whether the user is an administrator or an operator is determined from the identification information, to thereby change an operation that can be performed when a result of verification using a defective item image is displayed. In short, the visual inspection device 2 according to the present embodiment acquires a plurality of different identification information, and switches and displays the state between allowing a selection as to whether or not to return the state to the state before additional learning (see FIG. 24A) and forcedly returning the state to the state before additional learning.

Whether or not the operating user is an administrator or a general user is determined based on identification information on the user. That is, by previously storing user information into the storage unit 23 in association with the identification information and acquiring the identification information on the user by a log-in operation or the like (identification information acquiring unit 83), a selection of updating the stored learning data can be accepted when the user is an administrator.

FIG. 25 is a flowchart showing a procedure of verification processing by use of a defective item image, which is performed by the main control part 21 of the visual inspection device 2 according to the embodiment of the present invention.

As shown in FIG. 25, the main control part 21 of the visual inspection device 2 stores learning data in a state before additional learning as a backup into the storage unit 23 (step S2501). Naturally, as described above, this backup processing is not necessarily required to be performed when a nonvolatile memory or the like is used.

Next, a non-defective/defective determination is performed in the operation mode or the setting mode, and out of images of items determined as NG (stored in the storage unit 23), the user selects an image which is an image of an item desired by the user to be treated as a non-defective item (image of a non-defective item) via the display device 3 or the like. That is, the main control part 21 accepts from the user a selection of an image which is an image of an item desired to be treated as a non-defective item (step S2502). The image whose selection has been accepted is stored into the non-defective item image data storing part 231. The order of the processing of step S2502 and the processing of step S2501 may be reversed. That is, one or more selections of images which are images of items desired to be treated as non-defective items are accepted (step S2502), and for example, at the time of the user selecting a "NEXT" button shown in FIG. 20, backup processing (step S2501) may be performed, followed by additional learning (step S2503).

The main control part 21 performs additional learning including an image whose selection has been accepted (step S2503), and updates the defect threshold for detecting a defect and the determination threshold (upper limit of the defect amount) for making a non-defective/defective determination (step S2504). In other words, by use of an image which is stored in the non-defective item image data storing part 231 and whose selection has been accepted in step S2502 (image of an item determined as NG in the operation mode), non-defective item learning processing is performed, to at least update a defect threshold. Although the determination threshold is also updated by automatic setting for the threshold (step S403 of FIG. 4) in the present embodiment, only the defect threshold may be updated. The main control part 21 executes verification by use of a defective item image based on the updated defect threshold and determination threshold (step S2505). More specifically, the main control part 21 reads out the defective item image stored in the defective item image data storing part 232, and makes a non-defective/defective determination on the defective item image by use of the defect threshold and determination threshold updated in step S2504. In short, a defective portion is re-detected based on the defect threshold updated (reset) in step S2504, and a non-defective/defective determination is made on a defective item image read out from the defective item image data storing part 232 based on the previously set determination threshold.

The main control part 21 determines whether or not an NG determination has been made on the defective item image (step S2506). When the main control part 21 determines that an NG determination has been made on the defective item image (step S2506: YES), the main control part 21 determines that additional learning is appropriate, and stores learning data after execution of additional learning into the storage unit 23 (step S2507).

When the main control part 21 determines that an OK determination has been made on the defective item image (step S2506: NO), the main control part 21 determines that additional learning is inappropriate, and returns the data to the learning data which is stored as a backup in the storage unit 23 before execution of additional learning (step S2508), and the processing is completed. In the present embodiment, as shown in FIG. 24A, when the user is an administrator, it is possible to select whether to return the data to the state before additional learning or to continue the processing. On the other hand, as shown in FIG. 24B, when the user is an operator, only a selection of an operation to return the data to the state before execution of additional learning is accepted. In short, based on identification information for identifying the user which is stored in the storage unit 23 or the like, a display pattern for accepting a selection is changed. In other words, a plurality of different display patterns are previously stored in the storage unit 23, and the main control part 21 selects one display pattern in accordance with the acquired identification information, to display the pattern on the display device 3. In accordance with the acquired identification information, contents of selections acceptable by the user are changed. It is thereby possible to avoid a risk of the operator erroneously performing non-defective item learning processing, and further to prevent deterioration in determination accuracy.

As described above, according to the present embodiment, when additional learning is performed with a newly acquired image included, it is possible to check whether or not a defective item image is an image of an item non-erroneously determined as a defective item. Therefore, the user can visually check whether or not a setting parameter, a defect threshold, and a determination threshold, with which non-defective item learning processing has been performed, are appropriate, namely, whether even an image of an item which should essentially be determined as a defective item is not erroneously determined as a non-defective item.

Figure 26:
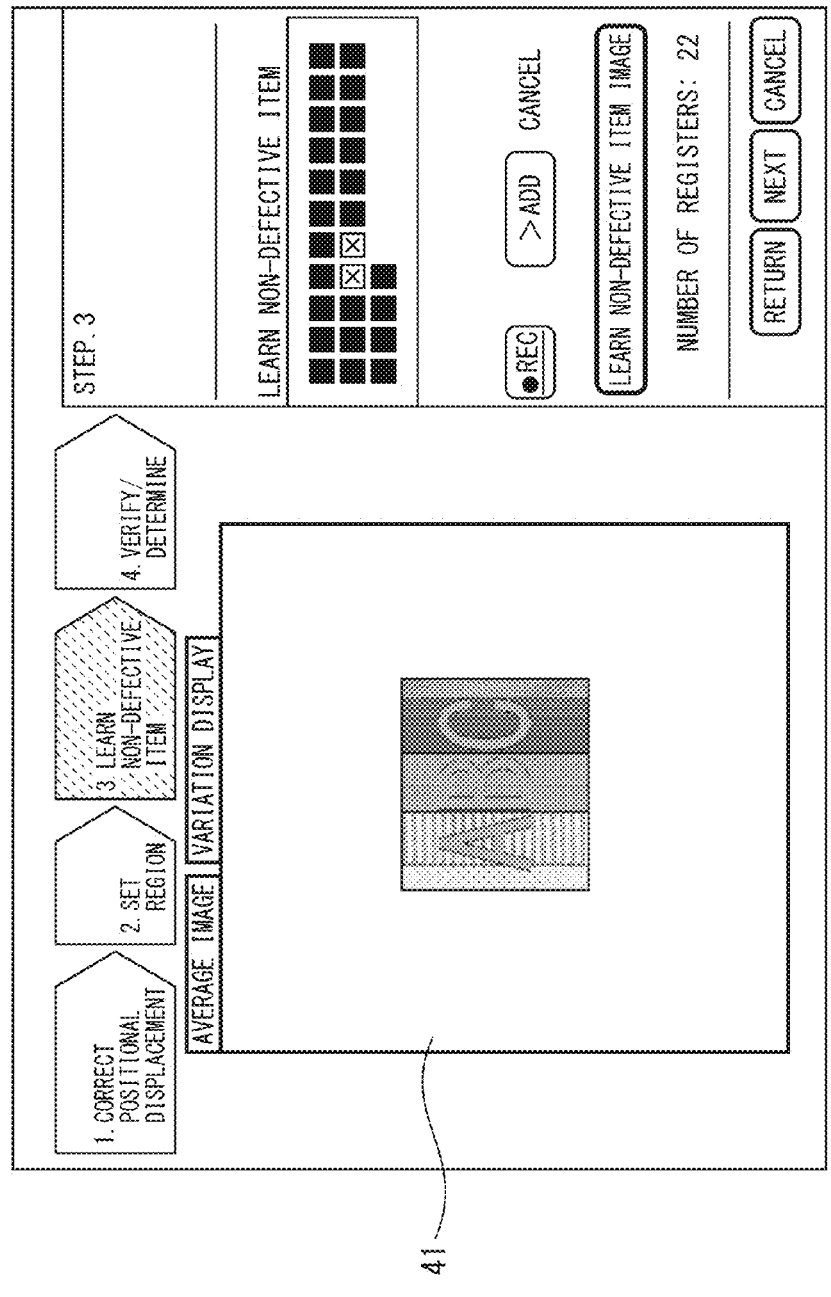
FIG. 26 is an illustrative view of a non-defective item image input accepting screen after non-defective item learning processing in the visual inspection device according to the embodiment of the present invention.

It is to be noted that the magnitude of the standard deviation a constituting the defect threshold may be displayed as a variation degree. FIG. 26 is an exemplary view of a non-defective item image input accepting screen after the non-defective item learning processing in the visual inspection device 2 according to the embodiment of the present invention. In FIG. 26, the standard deviation image is displayed in the image display region 41. In the standard deviation image, a change in gradation is preferably expressed by a change in hue. This is because, for example, a defect in a boundary portion or the like where determination accuracy deteriorates due to the change in hue can be visually checked. Although the hue is changed here, for example, hue and chroma may be simultaneously changed.

Further, a display of only the defect portion has also been made. However, in the case of displaying only the defective portion, there has been a problem that which portion of the inspection object 6 the defect has occurred is unclear. Therefore, for example in the case of occurrence of a defect, a defective portion is colored and the other portion is grayed, which are then displayed.

Figure 27:
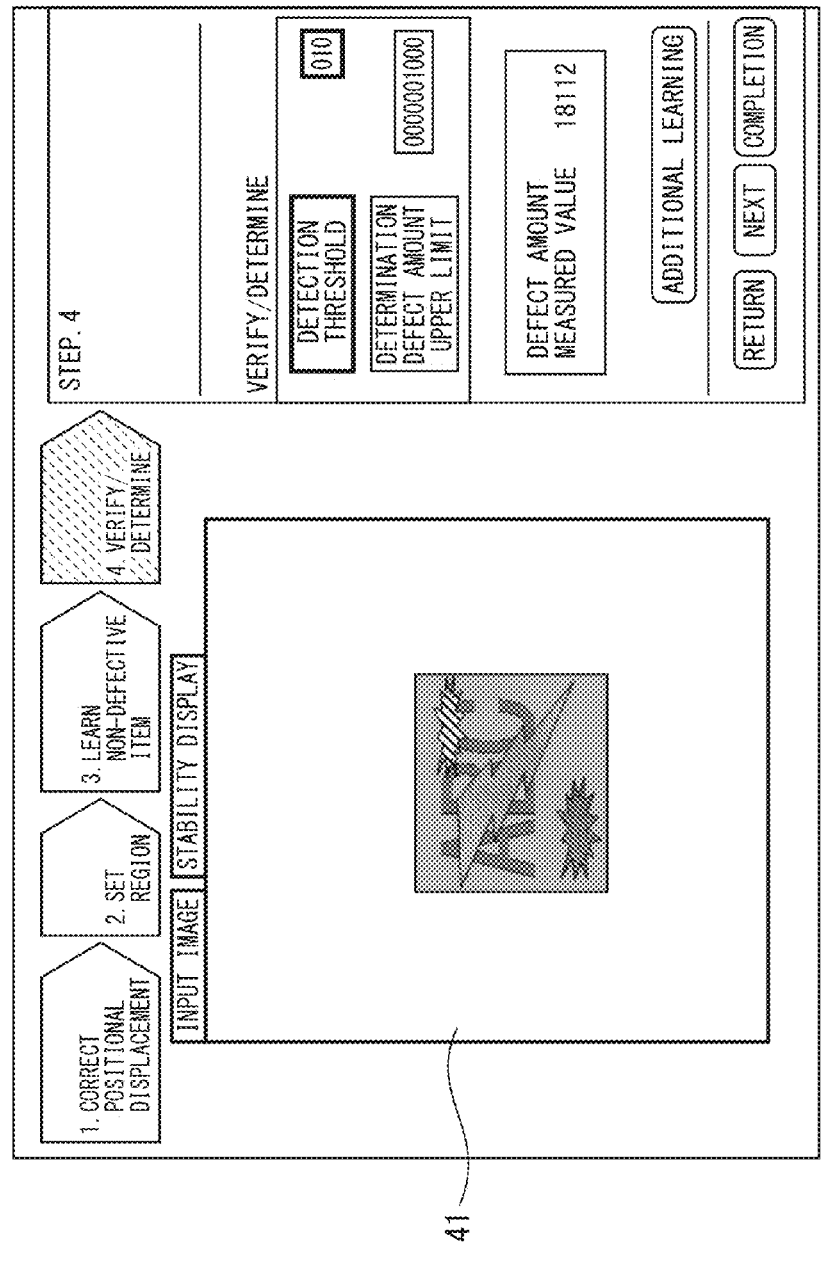
FIG. 27 is an exemplary view of a result display screen after the non-defective item learning processing in the visual inspection device according to the embodiment of the present invention.

FIG. 27 is an exemplary view of a result display screen after the non-defective item learning processing in the visual inspection device 2 according to the embodiment of the present invention. As shown in FIG. 27, a defective item image with a defective portion detected is displayed in the image display region 41. In this case, a color of the defective portion is changed and displayed, for example, in red while the other portion is displayed in gray, so that the user can easily visually check in which portion of the inspection object 6 the defect has occurred.

Further, the shape of a predetermined region of the average image may be previously stored, and at the time of accepting an input of a non-defective item image, the shape of the predetermined region of the average image may be detected from the image whose input has been accepted. When the shape of the predetermined region cannot be detected, a region to be inspected in the inspection object 6 might be erroneously set, and the determination accuracy significantly deteriorates. Accordingly, detecting the shape of the predetermined region can prevent deterioration in determination accuracy.

Figure 28:
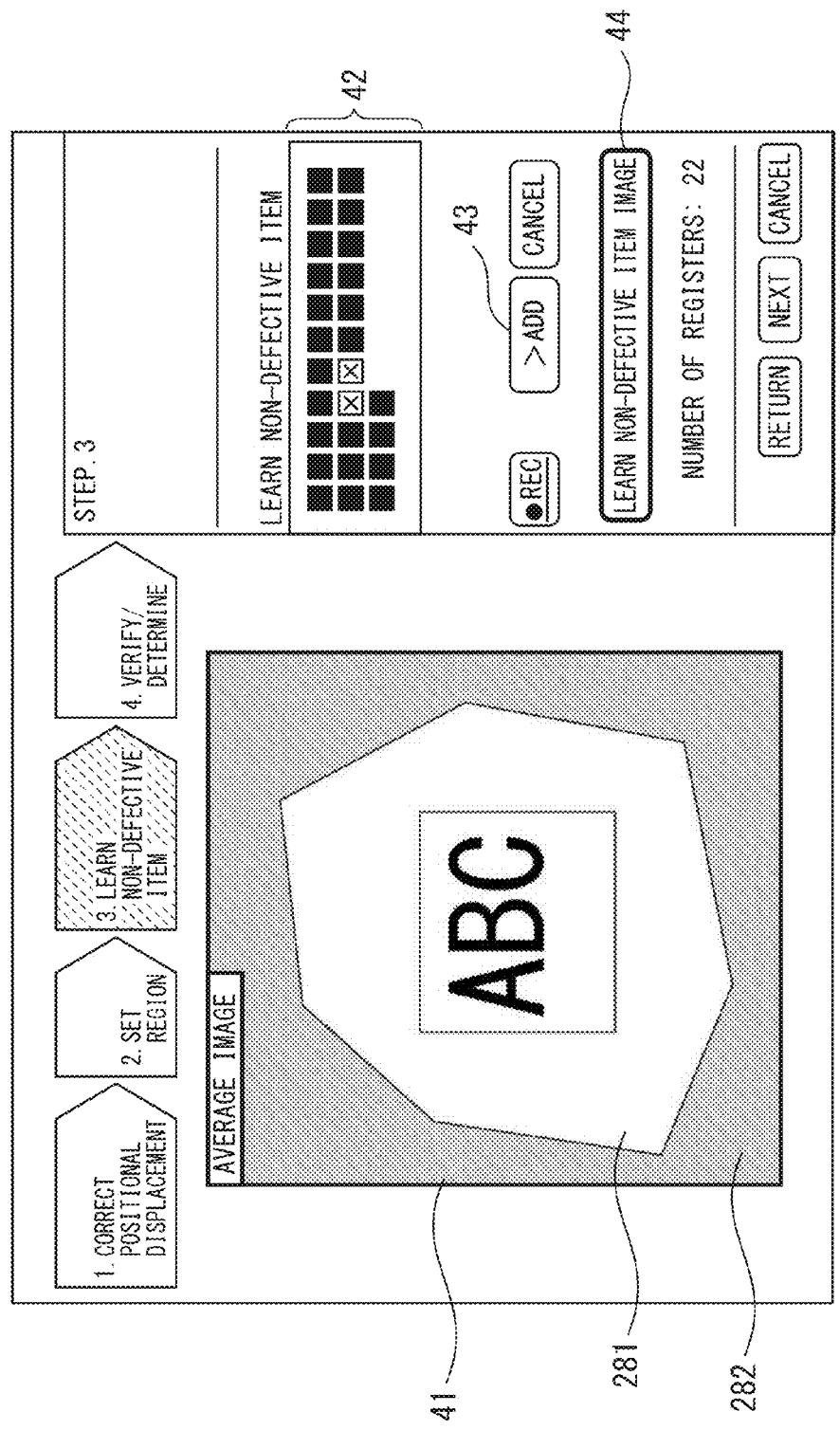
FIG. 28 is an exemplary view of a non-defective item image input accepting screen after the non-defective item learning processing in the visual inspection device according to the embodiment of the present invention.

FIG. 28 is an exemplary view of a non-defective item image input accepting screen after the non-defective item learning processing in the visual inspection device 2 according to the embodiment of the present invention. In the image display region 41, an average image is displayed. In the example of FIG. 28, when inputs of a plurality of images constituting the group of images of items regarded as non-defective items are accepted, a region which is superimposed on the average image to allow calculation of the average image, namely, a region 281 common among all the non-defective item images (region where all the non-defective item images are superimposed) is displayed. In a region 282 other than the above region, the average image cannot be calculated, and hence the non-defective item learning processing cannot be performed.

That is, the region 282 not included in all the non-defective item images exists due to positional displacement, and when such a region 282 exists in a large area, the determination accuracy significantly deteriorates. Therefore, the regions 281, 282 are superimposed and displayed on the average image, thereby allowing the user to visually check the presence of the region 282 where the average image cannot be calculated, so as to prevent deterioration in determination accuracy.

Figure 29:
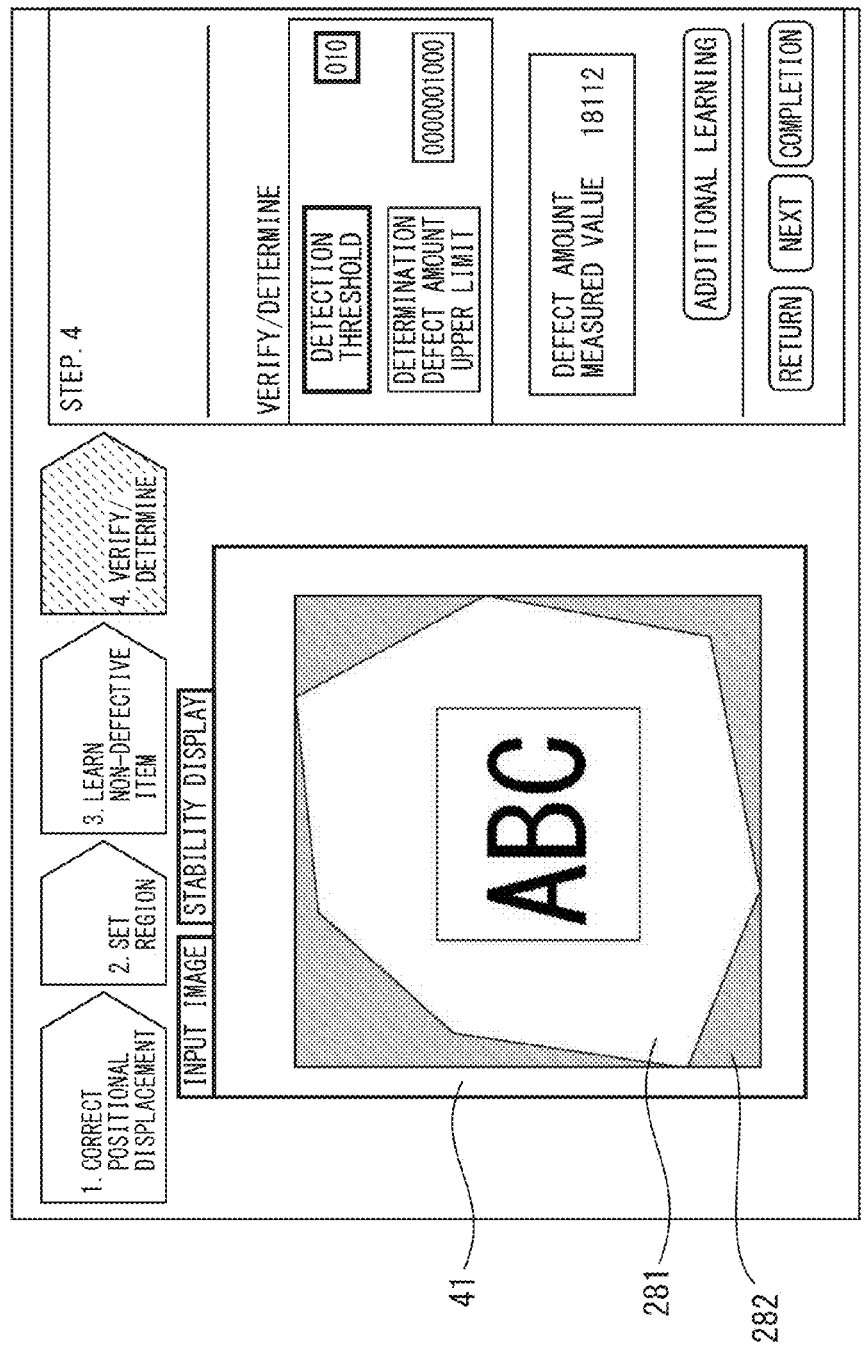
FIG. 29 is an exemplary view of a result display screen after the non-defective item learning processing in the visual inspection device according to the embodiment of the present invention.

Further, FIG. 29 is another exemplary view of a display screen for a result of the non-defective item learning processing in the visual inspection device 2 according to the embodiment of the present invention. In the example of FIG. 29, the region 282 other than the region 281 common among all the non-defective item images (region where all the non-defective item images are superimposed) is displayed which is essentially not preferably displayed. In this case, a devise such as a change in display of the region 282 is performed, so that inclusion of the region where the average image cannot be calculated in the region to be inspected can be visually checked, and the average image is enlarged or the like for preventing display of the region 282, whereby it is possible to reset the region to be inspected so as not to include the region 282.

Further, by displaying variations in color, what color has been determined to be a color of a non-defective item may be visually checked. FIG. 30 is an exemplary view of a screen for checking a non-defective item color in the visual inspection device 2 according to the embodiment of the present invention.

As shown in FIG. 30, one point on an average image on color display made in the image display region 41 is selected. It is assumed that a "+" point 301 has been selected in FIG. 30. When the "+" point 301 is selected, a non-defective item color of the "+" point 301 is displayed in a non-defective item color display region (non-defective item color display part) 302. Visually checking the color displayed in the non-defective item color display region 302 can facilitate checking as to whether or not a color of a defective portion is included in the non-defective item colors, so as to verify whether or not non-defective item learning processing has been correctly performed.

Figure 31A:
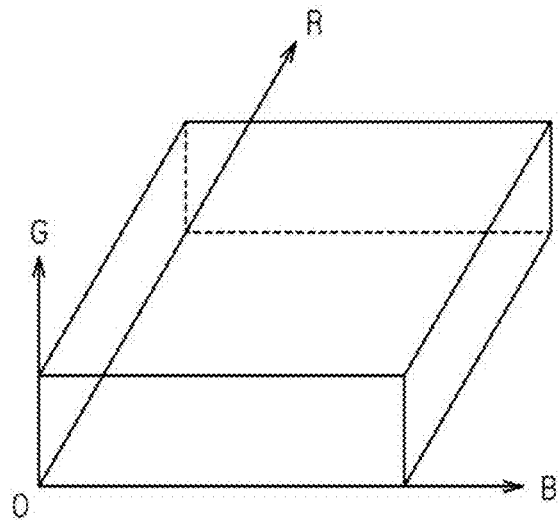
FIGS. 31A and 31B are explanatory diagrams of a non-defective item color deciding method in the visual inspection device according to the embodiment of the present invention.
Figure 31B:
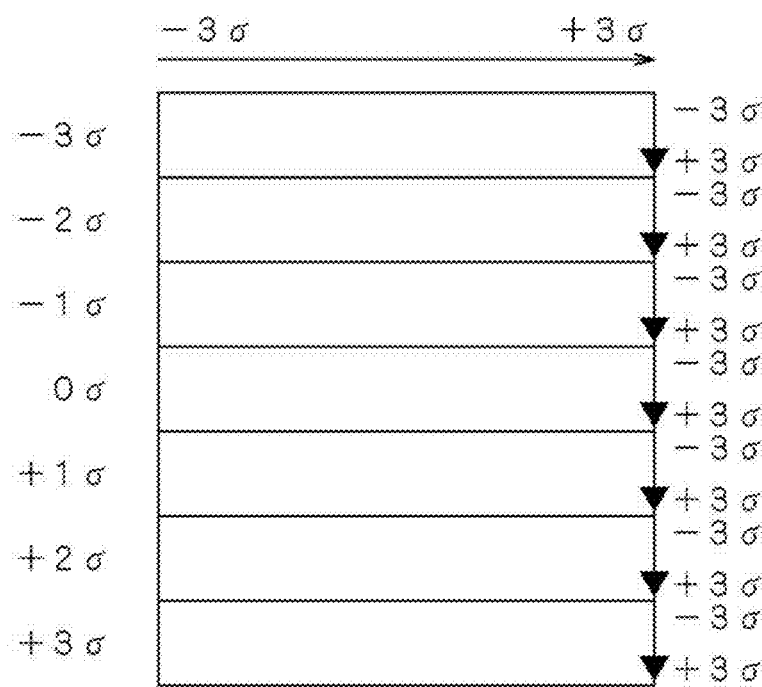

The non-defective item color is mapped from a Mahalanobis color space to a two-dimensional color space. FIGS. 31A and 31B are exemplary diagrams of a non-defective item color deciding method in the visual inspection device 2 according to the embodiment of the present invention. FIG. 31A is an exemplary view of a Mahalanobis color space. An R-axis, a G-axis, and a B-axis shown in FIG. 31A are taken, and parameters from $-3\sigma$ to $3\sigma$ are allocated in the respective axis directions.

FIG. 31B is a diagram showing correspondence between the parameters and colors displayed in the screen. The R-axis is mapped on a horizontal axis of FIG. 31B, the B-axis is mapped on each section obtained by division into seven sections in a vertical direction, and the G-axis is mapped on a vertical axis, to thereby two-dimensionally display spreading of the Mahalanobis space three-dimensionally obtained by means of the R-axis, the G-axis, and the B-axis. A color gradation displayed in the FIG. 31B is displayed in the non-defective item color display region 202. Although the respective axes of the rectangular parallelepiped of the Mahalanobis space are parallel to the R-axis, the G-axis, and the B-axis, they are not necessarily parallel.

It is to be noted that the present invention is not limited to the above embodiment, and a variety of changes, modifications, and the like can be made as long as it is within the scope of the gist of the present invention. For example, the camera 1, the display device 3, and the like may be integrated with the visual inspection device 2, or may be separated therefrom.

What is claimed is:

1. A visual inspection device which compares an image acquired by capturing an inspection object with a group of images of items regarded as non-defective items to make a non-defective/defective determination, the device comprising:

an image inputting unit for accepting inputs of a plurality of images constituting a group of images of items regarded as non-defective items;

a non-defective item image storing unit for storing these images;

a threshold setting unit for setting a defect threshold for detecting a defective portion of an inspection object and setting a determination threshold for making the non-defective/defective determination based on the plurality of images stored in the non-defective item image storing unit;

a defective item image storing unit for storing a defective item image which is an image of an item determined as a defective item;

a threshold resetting unit for resetting at least the defect threshold by performing non-defective item learning processing based on a plurality of images stored in the non-defective item image storing unit, in a case of acceptance of an additional input of an image acquired by capturing an inspection object, the plurality of images including the image accepted by the additional input;

a non-defective/defective determination unit for determining whether or not the defective item image stored in the defective item image storing unit is an image of a defective item based on the set determination threshold; and a determination result displaying unit for displaying a non-defective/defective determination result.

2. The visual inspection device according to claim 1, comprising:

a backup unit for storing information regarding non-defective item learning processing as a backup; and a selection accepting unit for accepting a selection as to whether or not to return the information to the stored information regarding non-defective item learning processing when an erroneous determination is made that the stored defective item image is an image of a non-defective item in the determination result.

3. The visual inspection device according to claim 2, comprising:

an identification information acquiring unit for acquiring identification information for identifying a user, wherein the selection accepting unit displays only an item whose selection is acceptable based on the acquired identification information.

4. The visual inspection device according to claim 3, wherein the selection accepting unit accepts a selection to update the stored information regarding non-defective item learning processing when the acquired identification information indicates an administrator.

5. The visual inspection device according to claim 3, wherein the selection accepting unit only accepts a selection to return the information to the stored information regarding non-defective item learning processing when the acquired identification information indicates an operator.

6. A visual inspection method executable by a visual inspection device which compares an image acquired by capturing an inspection object with a group of images of items regarded as non-defective items to make a non-defective/defective determination, the method comprising the steps of:

accepting inputs of a plurality of images constituting a group of images of items regarded as non-defective items;

storing the plurality of images in a non-defective item image storing unit;

setting a defect threshold for detecting a defective portion of an inspection object and setting a determination threshold for making the non-defective/defective determination based on the plurality of images stored in the non-defective item image storing unit;

storing a defective item image in a defective item image storing unit, which is an image of an item determined as a defective item;

resetting at least the defect threshold by performing non-defective item learning processing based on a plurality of images stored in the non-defective item image storing unit, in a case of acceptance of an additional input of an image acquired by capturing an inspection object, the plurality of images including the image accepted by the additional input;

determining whether or not the defective item image stored in the defective item image storing unit is an image of a defective item based on the set determination threshold, by detecting a defective portion based on the reset defect threshold; and displaying a non-defective/defective determination result.

7. The visual inspection method according to claim 6, comprising the steps of:

storing information regarding non-defective item learning processing as a backup; and accepting a selection as to whether or not to return the information to the stored information regarding non-defective item learning processing when an erroneous determination is made that the stored defective item image is an image of a non-defective item in the determination result.

8. The visual inspection method according to claim 7, comprising the step of:

acquiring identification information for identifying a user, wherein only an item whose selection is acceptable is displayed based on the acquired identification information.

9. The visual inspection method according to claim 8, wherein a selection to update the stored information regarding non-defective item learning processing is accepted when the acquired identification information indicates an administrator.

10. The visual inspection method according to claim 8, wherein only a selection to return the information to the stored information regarding non-defective item learning processing is accepted when the acquired identification information indicates an operator.

11. A computer program that is present on a non-transitory recording medium, the computer program executable by a visual inspection device which compares an image acquired by capturing an inspection object with a group of images of items regarded as non-defective items to make a non-defective/defective determination, the computer program causing the visual inspection device to function as:

an image inputting unit for accepting inputs of a plurality of images constituting a group of images of items regarded as non-defective items;

a non-defective item image storing unit for storing these images;

a threshold setting unit for setting a defect threshold for detecting a defective portion of an inspection object and setting a determination threshold for making the non-defective/defective determination based on the plurality of images stored in the non-defective item image storing unit;

a defective item image storing unit for storing a defective item image which is an image of an item determined as a defective item;

a threshold resetting unit resetting at least the defect threshold by performing non-defective item learning processing based on a plurality of images stored in the non-defective image storing unit in a case of acceptance of an additional input of an image acquired by capturing an inspection object, the plurality of images including the image accepted by the additional input;

a non-defective/defective determination unit for determining whether or not the defective item image stored in the defective item image storing unit is an image of a defective item based on the set determination threshold; and a determination result displaying unit for displaying a non-defective/defective determination result.

12. The computer program according to claim 11, wherein the visual inspection device is caused to function as:

a backup unit for storing information regarding non-defective item learning processing as a backup; and a selection accepting unit for accepting a selection as to whether or not to return the information to the stored information regarding non-defective item learning processing when an erroneous determination is made that the stored defective item image is an image of a non-defective item in the determination result.

13. The computer program according to claim 12, wherein the visual inspection device is caused to function as an identification information acquiring unit for acquiring identification information for identifying a user, and the selection accepting unit is caused to function as a unit for displaying only an item whose selection is acceptable based on the acquired identification information.

14. The computer program according to claim 13, wherein the selection accepting unit is caused to function as a unit for accepting a selection to update the stored information regarding non-defective item learning processing when the acquired identification information indicates an administrator.

15. The computer program according to claim 13, wherein the selection accepting unit is caused to function as a unit that only accepts a selection to return the information to the stored information regarding non-defective item learning processing when the acquired identification information indicates an operator.

* * * * *